United States Patent [19]
Yarnall, Jr. et al.

[11] Patent Number: 5,808,551
[45] Date of Patent: Sep. 15, 1998

[54] ELECTRONIC CONFINEMENT SYSTEM FOR ANIMALS OR PEOPLE TRANSMITTING DIGITALLY ENCODED SIGNALS

[76] Inventors: Robert G. Yarnall, Jr.; Robert G. Yarnall, Sr., both of P.O. Box 758, Ford Rd., Kimberton, Pa. 19442

[21] Appl. No.: 607,397

[22] Filed: Feb. 27, 1996

Related U.S. Application Data

[63] Continuation-in-part of Ser. No. 286,668, filed as PCT/US95/09950, Aug. 4, 1995, Pat. No. 5,610,588, and a continuation-in-part of Ser. No. 414,912, Mar. 31, 1995, Pat. No. 5,565,850.

[51] Int. Cl.$^6$ ................................................. G08B 23/00
[52] U.S. Cl. .................... 340/573; 119/721; 119/908; 128/903; 340/693; 455/90; 455/575
[58] Field of Search .................... 340/573, 693, 340/870.16, 825.49, 539; 455/89, 90, 575; 119/721, 908; 128/903; 429/127

[56] References Cited

U.S. PATENT DOCUMENTS

| | | | |
|---|---|---|---|
| 4,208,658 | 6/1980 | Fujiki et al. | 342/70 |
| 4,225,206 | 9/1980 | Roman, Jr. | 439/274 |
| 4,229,724 | 10/1980 | Marcus | 340/988 |
| 4,242,668 | 12/1980 | Herzog | 340/539 |
| 4,297,684 | 10/1981 | Butter | 340/557 |
| 4,371,937 | 2/1983 | Wahl et al. | 364/444 |
| 4,480,310 | 10/1984 | Alvarez | 364/450 |
| 4,494,553 | 1/1985 | Sciarra et al. | 128/903 X |
| 4,656,476 | 4/1987 | Tavtigian | 340/993 |
| 4,675,656 | 6/1987 | Narcisse | 340/573 X |
| 4,733,633 | 3/1988 | Yarnall, Sr. et al. | 340/573 X |
| 4,745,882 | 5/1988 | Yarnall, Sr. et al. | 340/573 X |
| 4,898,120 | 2/1990 | Brose | 340/573 X |
| 4,967,695 | 11/1990 | Giunta | 119/721 |
| 4,996,945 | 3/1991 | Dix, Jr. | 119/721 |
| 5,067,441 | 11/1991 | Weinstein | 340/573 X |
| 5,121,711 | 6/1992 | Aine | 340/573 X |
| 5,161,485 | 11/1992 | McDade | 340/573 X |
| 5,170,149 | 12/1992 | Yarnall, Sr. et al. | 340/573 |
| 5,207,178 | 5/1993 | McDade et al. | 340/573 X |
| 5,241,923 | 9/1993 | Janning | 340/573 X |
| 5,266,944 | 11/1993 | Carroll et al. | 340/573 X |
| 5,307,053 | 4/1994 | Wills et al. | 340/573 |
| 5,322,034 | 6/1994 | Willham et al. | 340/573 X |
| 5,335,664 | 8/1994 | Nagashima | 128/903 X |
| 5,425,330 | 6/1995 | Touchton et al. | 119/721 |
| 5,435,271 | 7/1995 | Touchton et al. | 119/721 |
| 5,460,124 | 10/1995 | Grimsley et al. | 340/573 X |
| 5,572,401 | 11/1996 | Carroll | 429/127 X |
| 5,610,588 | 3/1997 | Yarnall, Jr. et al. | 340/573 |

OTHER PUBLICATIONS

"R5000 Receiver–Collar", Invisible Fencing Operation Manual and Training Guide (1991), p. 5.

*Primary Examiner*—Thomas J. Mullen, Jr.
*Attorney, Agent, or Firm*—Ratner & Prestia

[57] ABSTRACT

An electronic containment system that confines an animal or a person to a predetermined confinement area. The system has a home base that transmits data on a partially modulated signal to a transceiver worn by an animal or a person. When the animal's or person's transceiver detects the data on the partially modulated carrier wave, the transceiver activates one of a number of different features of the transceiver unit. The electronic containment system deters the animal or person from leaving the predetermined outer perimeter, by activating an annoying noise, a deterrent shock, or both. The transceiver can also transmit a digitized word and data pertaining to the transceiver, battery power, and telemetry reading of the animal or person. The home base detects and reads the data transmitted from the receiver.

28 Claims, 15 Drawing Sheets

8 Bit Serial Data Word Format

ELECTRONIC CONFINEMENT SYSTEM FOR ANIMALS OR PEOPLE TRANSMITTING DIGITALLY ENCODED SIGNALS

This patent application is a continuation-in-part application of application Ser. No. 08/286,668 filed on Aug. 5, 1994, issued as U.S. Pat. No. 5,610,588 on Mar. 11, 1997, and a continuation-in-part of application Ser. No. 08/414,912 filed on Mar. 31, 1995, issued as U.S. Pat. No. 5,565,850 on Oct. 15, 1996, and a continuation-in-part of pending application PCT/US95/09950 filed on Aug. 4, 1995 under the Patent Cooperation Treaty.

FIELD OF THE INVENTION

This invention relates to an electronic confinement arrangement for animals, and more particularly to a wire fence confinement arrangement which utilizes a boundary antenna to transmit a modulated signal to activate a receiver positioned on an animal.

BACKGROUND OF THE INVENTION

One system for accomplishing the confinement of an animal is disclosed in U.S. Pat. No. 5,170,149 entitled CONFINEMENT ARRANGEMENT FOR ANIMALS and issued to Yarnall, Sr. et al. This and other conventional systems mount a receiver on a collar. The collar delivers a shock to an animal wearing the collar when the animal is in relatively close proximity to a perimeter antenna wire. The conventional systems are unintentionally activated, however, by common and naturally occurring sources of unmodulated radio frequencies. These sources include, for example, lightning and household electrical motors such as those motors used in hair dryers and blenders.

Another exemplary conventional system is described in U.S. Pat. No. 4,898,120 entitled ANIMAL TRAINING AND RESTRAINING SYSTEM and issued to Brose. The '120 patent describes a system which includes a transmitter/receiver mounted on an animal's collar for transmitting a series of pulses. A control unit receives the transmitted pulses and provides them to an analog-to-digital (A/D) converter for converting the transmitted pulses to digital form based on the amplitude of the received pulses. A central processing unit (CPU) in the control unit uses the digital signals to define the average strength of the transmitted pulses to ascertain if the animal has approached a predetermined distance from the transmitter. The system does not distinguish the transmitted signal, however, from naturally occurring and common sources of unmodulated radio frequencies.

Another exemplary conventional system is described in U.S. Pat. No. 4,967,695 entitled SYSTEM FOR CONTROLLING THE MOVEMENT OF AN ANIMAL and issued to Giunta. The '695 patent describes a confinement system which uses three separate antennas to overcome the problem of a temporary loss of signal when the animal changes direction of travel. The three separate antennas are linked to three individual measuring circuits, which are then connected to a comparator circuit that is linked to a switch circuit. The system has a comparator circuit and a large number of antennas and measuring circuits—all of which must fit inside the animal's receiver unit. These components may increase the size of the receiver unit. In addition, there is an increased drain on the battery used to power the receiver because of the increased number of electronic components that are located in the animal's collar unit. Finally, the manufacturing cost of the animal's receiver unit may be increased.

The foregoing illustrates the limitations known to exist in present confinement systems. Thus, it is apparent that it would be advantageous to provide an alternative confinement system which will account for common and naturally occurring sources of unmodulated radio frequencies and will include an animal's receiver unit that can overcome temporary loss of signal without requiring extensive additional circuitry. Accordingly, these are the principal objects of the present invention.

SUMMARY OF THE INVENTION

To achieve these and other objects, and in view of its purposes, the present invention provides an animal or person confinement arrangement including a home base for transmitting a modulated signal and a receiver for receiving the modulated signal. The received modulated signal is demodulated using a demodulator. The demodulated signal is compared to a reference signal to produce a comparator signal indicating whether the received modulated signal was transmitted by the home base. Also provided is deterrent circuitry which is responsive to a strength level of the received modulated signal for producing a deterrent signal. The deterrent signal is applied to an animal or a person if the comparator signal indicates that the received modulated signal was transmitted by the home base.

In another exemplary aspect of the present invention, the modulated signal transmitted from the home base is encoded with a digital signal. The received encoded modulated signal is demodulated and the digital signal recovered in the receiver. The deterrent, in response to the strength level of the received modulated signal and the digital code, produces the deterrent signal. The deterrent signal is applied to the animal or person if the digital signal was transmitted from the home base.

In another exemplary aspect of the present invention, a confinement arrangement including a home base transmitter for transmitting modulated signals is provided. A first wire defines a confinement area and receives and emits a first modulated signal. A second wire within the confinement area and adjacent to the home base receives and emits a second modulated signal. A receiver attached to an animal or a person detects a first, low strength level of the first modulated signal from the first wire and activates deterrent devices on the collar. If the animal or the person continues toward the first wire, the receiver also detects a second, higher strength level of the first modulated signal from the first wire and activates an alarm signal to the home base and disconnects the deterrent circuits. If the animal or the person approaches the second wire, the receiver detects the second modulated signal and reactivates the deterrent circuits, thereby reconfining the animal or the person.

In another exemplary aspect of the present invention, an adjustable signal detection circuit and an adjustable spike out circuit are provided in the animal's or the person's receiver. The adjustable signal detection circuit permits the sensitivity of the receiver to be adjusted to activate the deterrent circuits at different distances from the first wire. The level of the deterrent is also adjustable to provide varying degrees of deterrence.

In still another exemplary aspect of the present invention, a portable collar communicator is included in the receiver. A user is able to communicate with the animal or the person via a microphone positioned at the home base or through a portable unit. The output of the microphone is converted, amplified, combined with a modulated frequency, and then transmitted to the receiver. In response to detection of the owner's modulated voice signal, a collar communicator circuit in the receiver converts the transmitted voice signal so the animal or the person can hear the user's transmitted voice. The collar communicator circuit includes a power saver circuit permitting use of the collar communicator circuit without consuming excessive energy from the receiver's power supply.

In another exemplary aspect of the present invention, the receiver includes an antenna for detecting the modulated signals from the first wire and the second wire. The antenna includes a ferrite core with four protruding legs arranged at an angle of substantially 90 degrees to each other. Each of the four legs are wound with a continuous length of wire. The antenna improves reception when the animal or the person is in full, unrestrained motion.

In another exemplary aspect of the present invention, a low battery strength level indicator is provided. When the intensity of a signal received from the collar unit falls below a predetermined value, an indicator warns the owner of an imminent power failure of the receiver. The system also includes a number of low battery indicators positioned at the base station which are responsive to different modulated signals transmitted by different receivers. Each receiver transmits respectively different modulated signals indicative of a low battery level for the different receivers.

In another exemplary aspect of the present invention, the receiver and the base station transmit digital codes. The digital codes transmitted from the receiver include the vital signs of the animal or the person, an indication of whether the animal or the person has escaped from the predefined confinement area, the status of the battery in the receiver, information about whether a deterrent has been applied to the animal or the person, and the receiver identification identifying the receiver. The digital codes transmitted from the base station include data for activating and deactivating the voice communicator in the receiver, a fence address identifying the home base, and other data for changing different settings in the receiver.

In still another exemplary aspect of the present invention, the receiver includes a flexible battery for providing power to the components of the receiver.

In another exemplary aspect of the present invention, the receiver includes multiple housings which are rotatably coupled together. One or more batteries are provided in one or more of the housings to provide additional energy for the receiver.

In another exemplary aspect of the present invention, the base station is coupled to a personal computer. Data generated by the base station and the receiver are stored in the personal computer. If an animal or person leaves the predefined confinement area, the personal computer contacts a user via phone, facsimile, or modem to warn the user of the escape. The user can also access the personal computer to obtain the data stored in the personal computer.

The foregoing and other aspects of the present invention will become apparent from the following detailed description of the invention when considered in conjunction with the accompanying drawing.

DESCRIPTION OF PREFERRED EMBODIMENTS AND BEST MODE

In general terms, the confinement system for animals of the present invention operates by transmitting a first, predetermined modulated signal to a receiver mounted on an animal's collar. The modulated signal is demodulated by the receiver and it is determined if the received signal is the modulated signal. If the demodulated and reference signals are similar, then the signal strength of the first signal is used to determine whether the animal is close to a boundary area. If the modulated and reference signals are not similar, the first signal is ignored. Although the exemplary embodiments illustrate the use of the confinement system by attaching the receiver to an animal, the receiver can also be attached to a person and used as described below.

Figure 1:
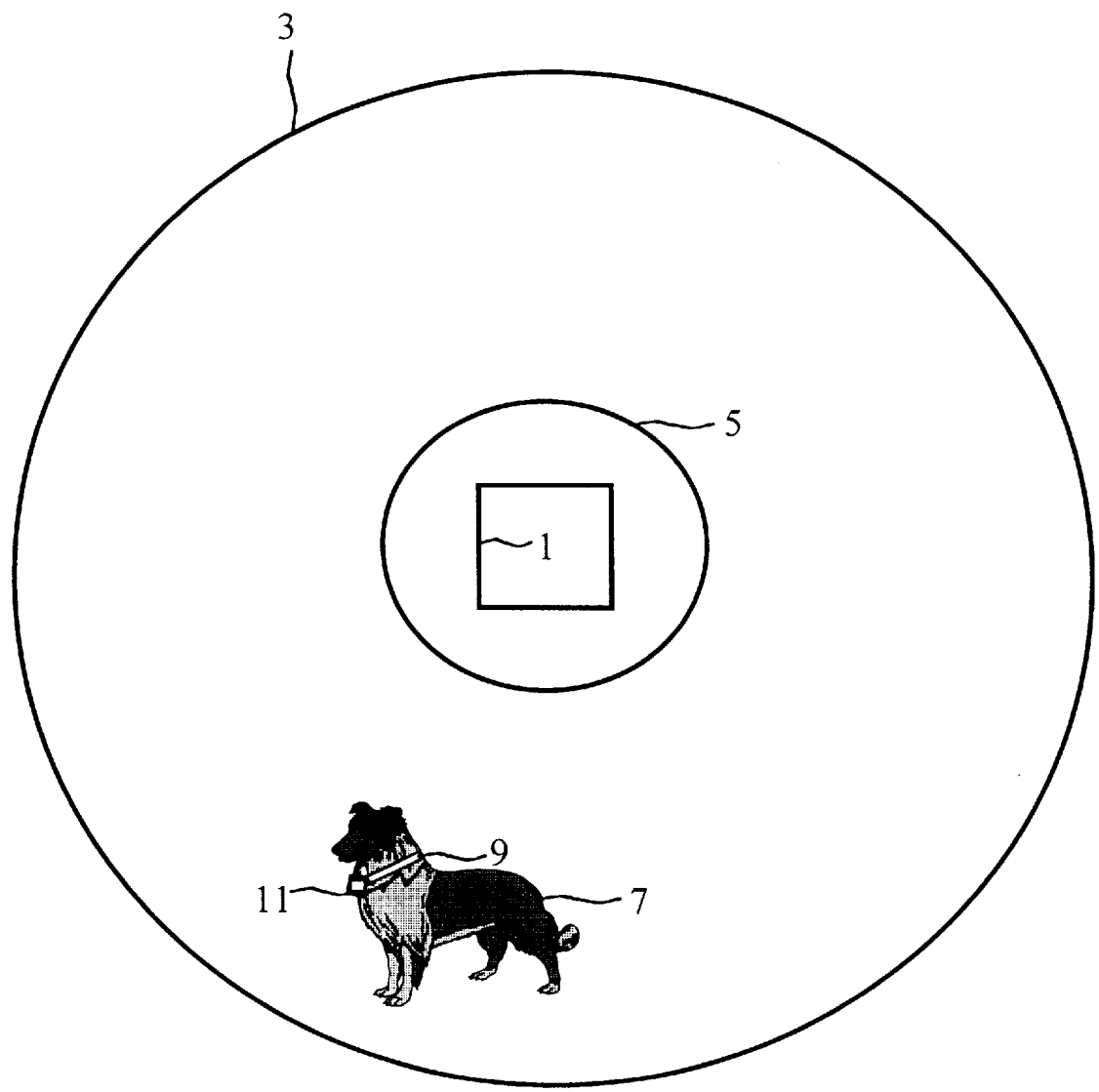
FIG. 1 is a schematic illustration of an exemplary confinement system in accordance with the present invention.

Referring to FIG. 1, there is shown a home base 1 which includes a transmitter for transmitting a first, predetermined modulated signal (A) and a second, predetermined modulated signal (B) which is different from the first, predetermined modulated signal (A). A first signal-emitting wire 3 responsive to the first signal (A) is disposed around a confinement area. Wire 3 can be above ground or buried under ground.

A second signal-emitting wire 5, responsive to the second signal (B), is disposed within the confinement area around home base 1. Wire 5 can circle home base 1 or be positioned adjacent to home base 1. Wire 5 can be above ground or buried under ground.

An animal 7 to be kept within the confinement area wears a collar 9 that carries a receiver 11. Receiver 11 is responsive to the first and second signals (A) and (B). First signal (A) is broadcast to wire 3, and is emitted therefrom. The strength of the emitted signal varies with the distance from wire 3, as is well known. As the animal 7 approaches wire 3, the strength of the signal continuously increases and as the animal 7 departs from wire 3 the strength of the signal decreases. Receiver 11 has a deterrent circuit responsive to a first level of strength of signal (A), preferably between 0.001 and 0.005 watts. Once the first level of strength of signal (A) is detected, the deterrent circuit produces a deterrent, including electrical shock and audio, which both act upon the animal to, it is hoped, drive the animal back toward the center of the confinement area.

If the animal 7 ignores the deterrent and continues toward wire 3, the receiver 11 activates its alarm and disconnect circuit. The alarm and disconnect circuit are responsive to a second level of strength of first signal (A), preferably 0.01 to 0.05 watts. After the second strength level of first signal (A) is detected, the disconnect and alarm circuit disconnects the deterrent circuit, so that the animal 7 no longer receives the deterrent, and it may wander outside the confinement area. The term "disconnect" herein refers to an electrical deactivation. Simultaneously with the disconnect, the collar alarm broadcasts an alarm activation signal back to the home base 1, warning the owner that the animal 7 has ignored the deterrent and is escaping.

After the animal 7 escapes, it may desire to return to the home base 1 or to the confinement area, due to habit or due to action of the owner. Collar 9 carries a reconnect circuit responsive to second signal (B). Once the animal 7 approaches wire 5, the reconnect circuit reactivates the disconnected deterrent circuit, and the animal 7 is reconfined.

Figure 2:
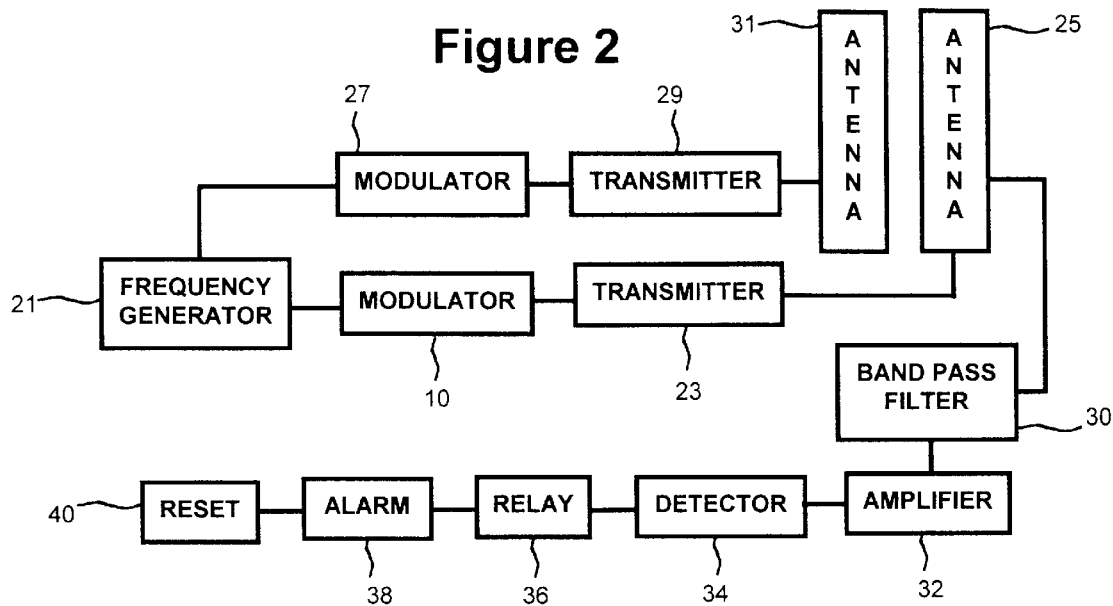
FIG. 2 is an exemplary circuit of a home base transmitter and alarm circuit in accordance with the present invention.

Referring to FIG. 2, an exemplary circuit for home base 1 is shown. The home base is powered by DC electricity. Home base 1 includes frequency generator 21 which generates an oscillating signal of predetermined frequency, for example, 30 kHz. A portion of the output of frequency generator 21 is directed to modulator 27, which shapes the curve of second signal (B), as is well known. Second signal (B) is then transmitted by second transmitter 29 to antenna 31, also referred to herein as wire 5. Wire 5 then emits second signal (B), which is received and processed by the receiver 11 in collar 9, as hereinafter described.

Wire 3 emits first signal (A) which is received and processed by the receiver 11 in collar 9. First signal (A) is a modulated signal which is generated by modulating a carrier signal, for example, the output signal of the frequency generator 21, with a modulating signal which is, for example, an analog signal or a digital signal. Modulated first signal (A) is generated by modulator 10. Modulated first signal (A) is then transmitted by first transmitter 23 to antenna 25, also referred to herein as wire 3.

As is described later, the first modulated signal is demodulated by a demodulator in the receiver 11 in collar 9 and compared to a reference signal or is examined to determine if the signal received by the receiver 11 in collar 9 has been transmitted from wire 3. As a result, the receiver 11 in collar 9 can prevent inadvertent activation of the deterrent circuit caused by radio waves generated by common and natural sources as well as signals generated by other confinement systems which are received by receiver 11 in collar 9.

Antenna 25 is also used to receive an alarm activation signal broadcast by the collar alarm to warn the owner that the animal has ignored the deterrent and is escaping. This alarm signal passes through a band pass filter 30 that only allows certain frequency signals to pass. The output signal of band pass filter 30 is provided to amplifier 32 which amplifies the signal. Detector 34 is activated by a signal of a certain signal strength. The output of detector 34 is coupled to relay 36, which is, in turn, coupled to alarm 38. The alarm 38 is activated to warn the owner of the escaping animal. The alarm may then be reset using reset circuit 40.

Modulator 10 can modulate signal (A) using a variety of modulation techniques including, for example, amplitude modulation, frequency modulation, pulse modulation and phase modulation, as are known.

First and second transmitters, 23 and 29, each have means for increasing or decreasing the signal strength, so as to increase the size of the field of transmitted and emitted signals, as is well known.

Figure 3:
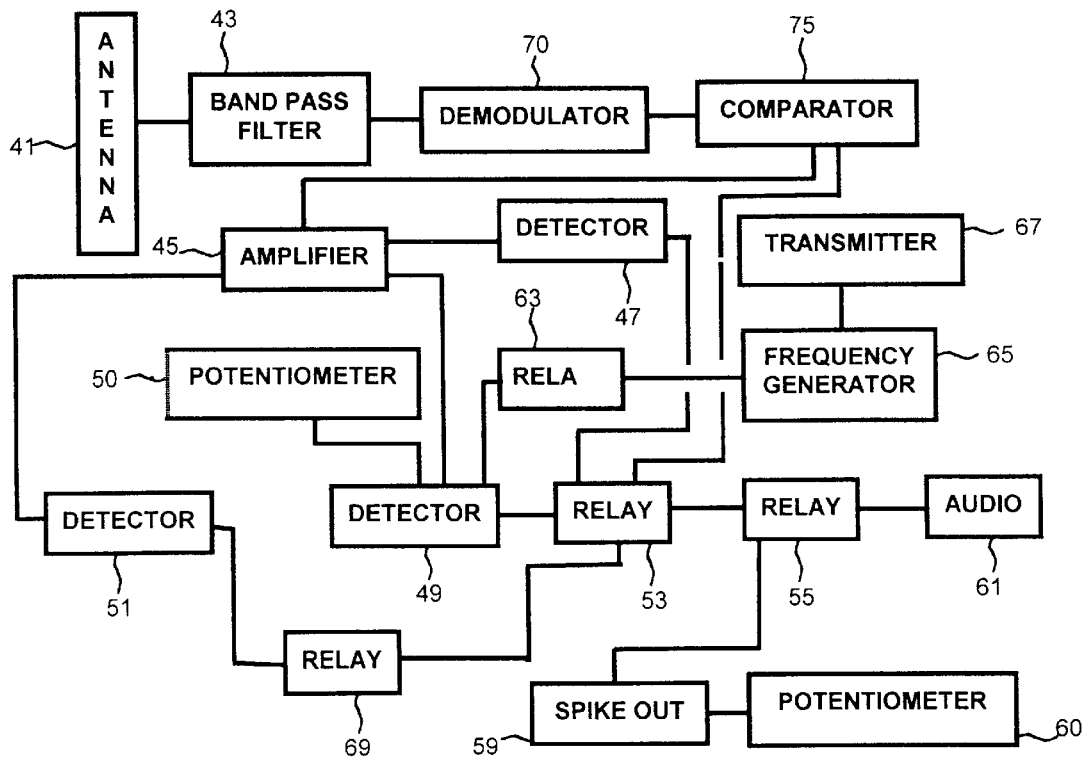
FIG. 3 is an exemplary circuit for a receiver with a deterrent circuit, an alarm circuit, and a deterrent control circuit in accordance with the present invention.

Referring to FIG. 3, an exemplary circuit for the receiver 11 in collar 9 is shown. As the animal 7 nears wire 3, the first strength level signal of modulated first signal (A) is detected by antenna 41 in receiver 11 in collar 9. First signal (A) passes through a band pass filter 43 that allows only the pre-designated frequency of 30 kHz to pass or frequencies around the pre-designated frequency of 30 kHz to pass. Depending on the selected modulation technique, the frequency of first signal (A) may vary. Accordingly, the band pass filter will be selected to pass frequencies which include the frequency or frequency range of first signal (A).

The output signal of band pass filter 43 is provided to (1) demodulator 70 which demodulates first signal (A) to extract the modulating signal. After signal (A) is demodulated, it is provided to comparator 75 which compares the demodulated signal (A') to a reference signal to determine if the demodulated signal is first signal (A) transmitted by wire 3. If the demodulated signal is the correct signal, then comparator 75 provides the first demodulated signal (A') to amplifier 45. Modulated first signal (A) and demodulated first signal (A') have substantially the same signal strength.

If the demodulated signal is not the correct signal, then comparator 75 ignores the input signal for a period of time. After the period of time has elapsed, the comparator compares the currently received signal to the reference signal to determine if the correct signal is received.

Amplifier 45 amplifies the demodulated first signal (A') up to 100 times, so as to energize the remainder of the circuit. The output of amplifier 45 is divided evenly among detectors 47, 49, and 51. Detector 47 is activated only in response to demodulated signal (A') corresponding to modulated signal (A) which has a received signal strength of between 0.001 and 0.005 watts. This signal level is detected when the animal is still some distance from wire 3. Detectors 49 and 51 are not activated by the first strength level of first signal (A). The output of detector 47 is coupled to first relay 53, which is, in turn, coupled to second relay 55.

Second relay 55 activates an electrical spike circuit 59 and an audio signal circuit 61 to produce an electrical shock and a sound unpleasant to the animal. Circuits to produce the electrical shock and audio are well known in the art and are described, for example, in U.S. Pat. No. 4,733,633 entitled ELECTRONIC CONFINEMENT ARRANGEMENT FOR ANIMALS and issued to Yarnall et al., which is incorporated herein by reference.

If animal 7 continues toward wire 3, second strength level of signal (A) is detected by detector 49. Detector 49 is activated only in response to demodulated signal (A') corresponding to modulated signal (A) having a received signal strength of between 0.01 and 0.05 watts. The output of detector 49 is coupled to third relay 63, which in turn activates frequency generator 65 to broadcast an alarm via transmitter 67 back to home base 1. Frequency generator 65 may be any type of generator capable of generating an oscillating signal at a predetermined frequency, preferably 50 kHz. Detector 49 is also coupled to first relay 53, which then activates second relay 55 to deactivate the electrical and audio circuits, 59 and 61, respectively.

After animal 7 returns to the proximity of second emitting wire 5, detector 51 detects the presence of modulated signal (B). Output of detector 51 acts upon fourth relay 69 to activate first relay 53, which activates the second relay 55, to reactivate the deterrent circuits of electrical shock and audio.

Alternatively, the received signal could be provided directly to amplifier 45. In this case, comparator 75 acts upon the second relay 55 directly or through relay 53 or detector 49 as illustrated by the broken line in FIG. 3, for example, to deactivate the deterrent circuits of electrical shock and audio for a specified period of time if the correct signal is not received.

Although signals (A) and (B) are transmitted at or around 30 kHz, other radio frequencies or bands of frequencies could be used. Likewise, the alarm signal frequency of 50 kHz could be another frequency. Also, while we have disclosed only a single frequency or band of frequencies for signals (A) and (B), a plurality of individual frequencies or bands of frequencies could be transmitted and received, one frequency or frequency band for a different animal, to make the system workable for a plurality of animals.

Referring to FIG. 3, and in particular, to potentiometer 50 and potentiometer 60, another embodiment, containing adjustable signal circuitry and adjustable spike out circuitry, is provided. The potentiometers 50 and 60 enable the user to individually customize an animal's collar detector unit sensitivity. This feature is desirable because some animals, for example trained animals, are less likely to leave the confinement area. In contrast, untrained animals are likely to need increased monitoring and deterrence to prevent the animal from leaving the confinement area. As a result, the owner would desire to lower the unit's sensitivity for a trained animal, while increasing the unit's sensitivity for an untrained animal.

In addition, the amount of spike out deterrent may be varied. As a result, the amount of current applied as a deterrence is variable. For example, dobermans are highly sensitive to electrical shocks. Thus, a lower spike out deterrent provides a suitable deterrent. Alternatively, rottweilers are not deterred by lower spike out levels. Accordingly, an elevated spike out deterrence is desirable. This feature is desirable because some animals need less of a deterrent to be contained within the predetermined confinement area, while some animals need more.

In FIG. 3, potentiometer 50 is coupled to detector 49, thereby allowing the user to increase or decrease the sensitivity of detector 49 to the outer perimeter's deterrent signal. Thus, the user can vary the strength of the modulated signal (A) that is necessary to activate detector 49. Potentiometer 60 is connected to the spike out circuit 59, thereby allowing the user to increase or decrease the level of the spike out deterrent to be sent to the animal. This circuitry may also be used when more than one animal is being contained within the predetermined confinement area.

Figure 4:
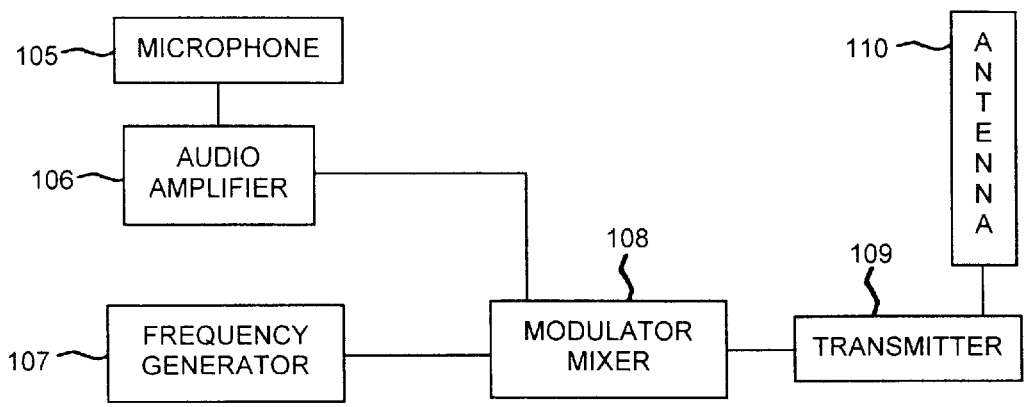
FIG. 4 is an exemplary circuit for a transmitter unit in accordance with an exemplary embodiment of the present invention.

FIG. 4, another exemplary embodiment, contains a collar communicator circuit for allowing the user to communicate with the animal via the receiver mounted on the animal's collar unit. This embodiment enables the animal's owner to communicate with the animal. FIG. 4 may be used as a stand-alone, hand-held unit which is easily transportable or may be integrated into the system of FIG. 2, with frequency generator 107, transmitter 109, and antenna 110 corresponding to frequency generator 21, transmitter 29, and antenna 31. In this arrangement, the modulator 108 mixer is coupled between frequency generator 107 and transmitter 109.

This embodiment is also portable and easily transportable, thereby permitting system mobility. For example, the owner is able to use the system to locate the animal even if the animal is out of range of the predetermined confinement area's antennas because the owner can travel with the transportable system.

FIG. 4 illustrates an embodiment of the transmitter unit 400. The transmitter unit 400 is small enough so that it may be either stationary or portable. The owner speaks directly into a microphone 105. The owner's voice is then electronically converted by the microphone 105 and amplified through an audio amplifier 106, as is well known. Frequency generator 107 creates a predetermined radio frequency (C) (for example, 99.5 kHz). The signal having frequency (C) is modulated and combined with the animal owner's electronically converted voice by a modulator mixer 108. The signal is then transmitted via a transmitter 109 and an antenna 110 to the receiver 11.

Figure 5:
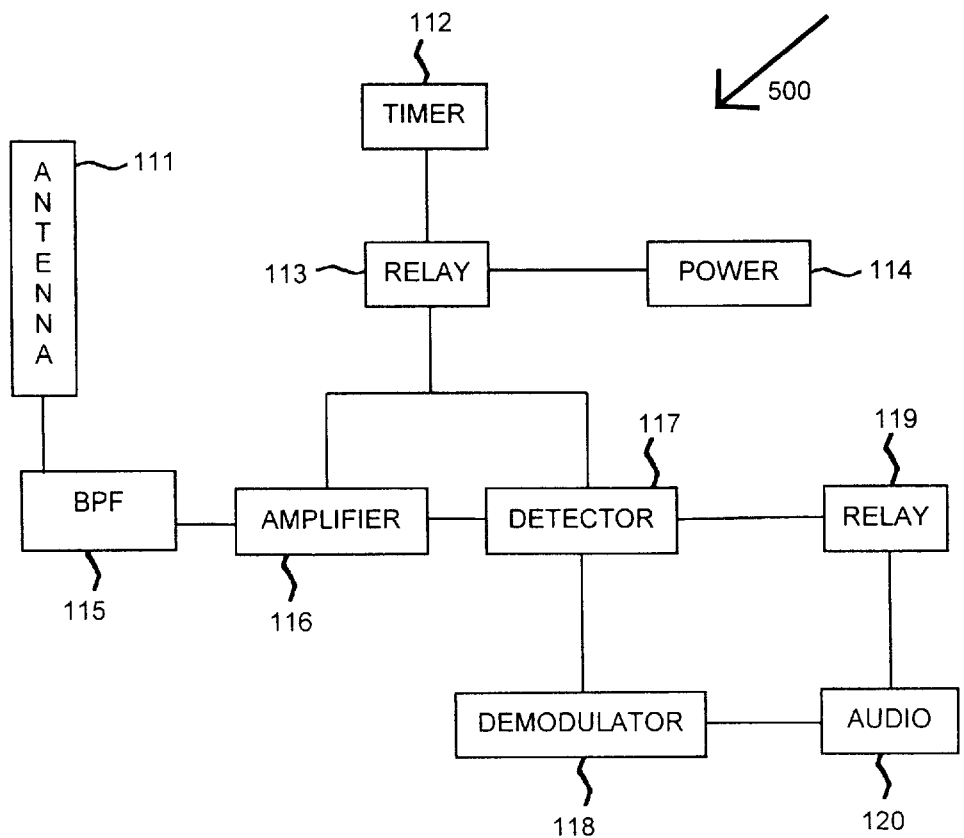
FIG. 5 is an exemplary communicator circuit of a receiver in accordance with an exemplary embodiment of the present invention.

In communicator circuitry 500, located in receiver 11, antenna 111, as shown in FIG. 5, receives all forms of radio signals, including frequency (C) sent from the transmitter unit 400. A timer 112 activates a relay 113 for a fraction of a second at predetermined timed intervals. Because the relay is activated for only a fraction of a second at regular intervals, and is not operating continuously, the battery life of the receiver unit is greatly increased.

The relay 113 allows power 114 to energize the detection circuitry, an amplifier 116 and a detector 117, of the communicator circuitry 500. When frequency (C) has been transmitted, band pass filter 115 allows frequency (C) (here, 99.5 kHz) or frequencies close to frequency (C) to pass through the bandpass filter. The amplifier 116 amplifies the received signal having frequency (C). In response to the presence of the signal having frequency (C), the detector 117 activates a relay 119 to energize audio 120 and demodulator 118, allowing the animal to hear the owner's voice. Antenna 111 may be incorporated as antenna 41 of the collar receiver unit of FIG. 3.

Figure 6:
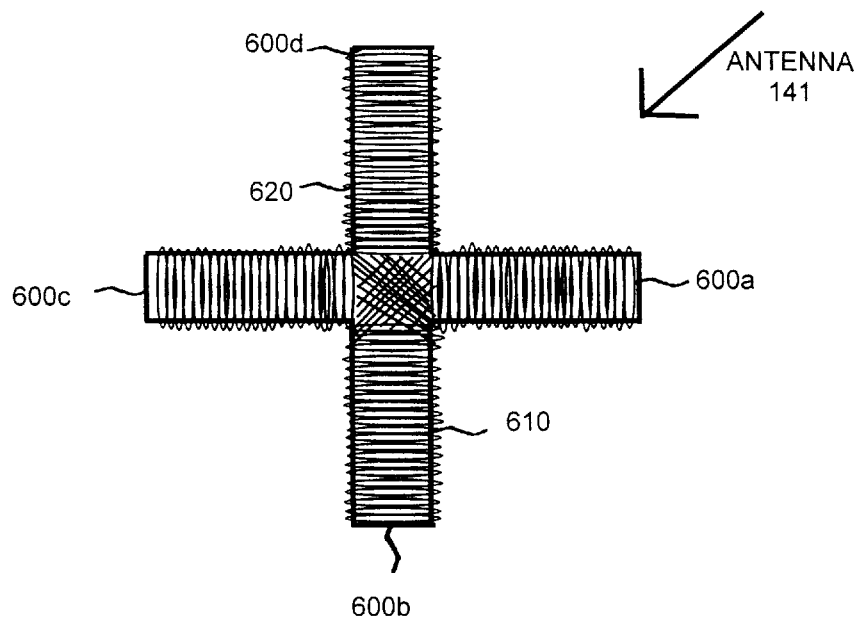
FIG. 6 is a schematic illustration of an exemplary antenna for the confinement system shown in FIG. 1.

FIG. 6 illustrates an exemplary antenna 141 which enables the user to maintain contact continuously with the animal, even when it is in motion and changes direction of travel. The antenna 141 eliminates the need for using multiple measuring circuits and detector circuits. It is a simple but highly functional design allowing the antenna to detect and transmit the required signals when the animal is in full and unrestrained movement.

The antenna 141 is a one-piece component that is comprised of one ferrite core 620 with four protruding legs 600a–600d at 90 degree angles to each other. Each of the four legs are wound with one continuous length of wire 610. The legs 600a–600d of the antenna 141 are two dimensional, laying flat on a single plane. Because only one antenna is used, the size of the animal's receiver 11 is kept small. Furthermore, because no additional components are used, such as measuring circuits and comparator circuits, there is no increased drain on the battery. Finally, manufacturing costs remain low. The antenna 141 may be incorporated as antenna 41 of the collar receiver unit shown in FIG. 3.

Figure 7:
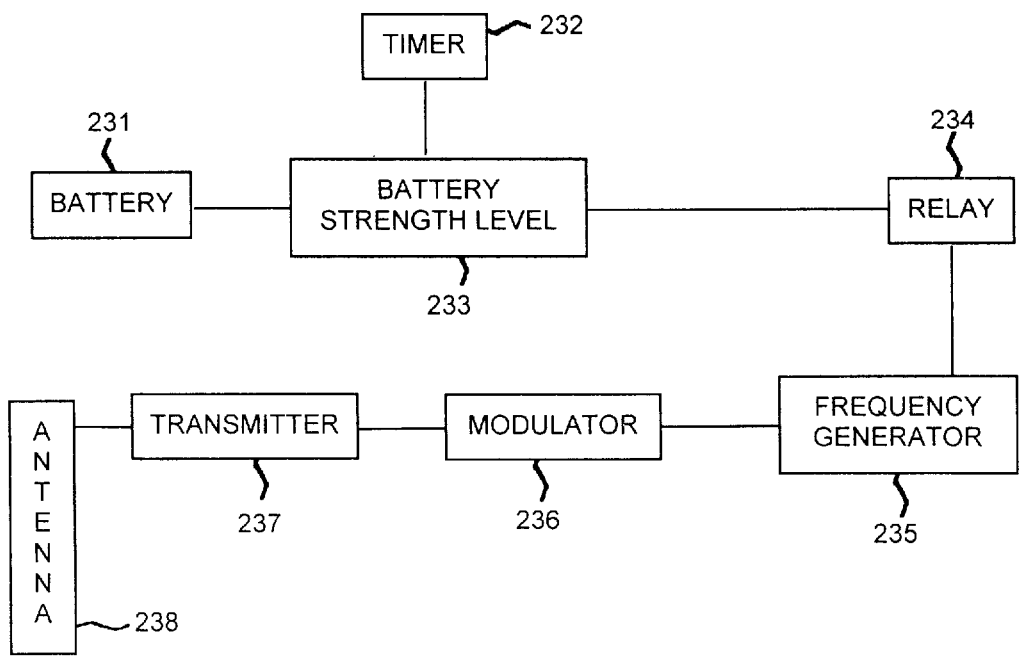
FIG. 7 is an exemplary circuit used in conjunction with the confinement system shown in FIG. 1.

Referring to FIG. 7, another embodiment, containing a low battery strength alarm, is provided. In this embodiment, the current level of the battery 231 in the receiver 11 is checked periodically for a low battery strength level. Either or both of wires 3 and 5 (see FIG. 1) may be used as receiving antenna(s) for receiving a signal (D), the low battery strength indicator signal. Recalling FIG. 1, an animal 7 to be kept within the predefined confinement area, determined by wire 3, wears a collar 9 that carries a receiver 11 for signal (D).

Referring to FIG. 7, a battery strength level indicator 233 measures the current level of battery 231 of the animal's receiver 11. To reduce the energy drainage of this circuit on the battery 231, a timer 232 activates this circuit at predetermined time intervals (for example, once every 4 hours). If the battery strength level indicator 233 reads a low current level from the battery 231, a relay 234 activates a frequency generator 235. The frequency generator 235 generates a low battery strength signal (D). A modulator 236 modulates the low battery strength signal (D) to the predetermined modulation level in accordance with the specific animal's receiver 11. A transmitter 237 transmits the low battery strength signal (D), with its proper modulation levels, through an antenna 238, to be received at the home base 1 by the user.

Figure 8:
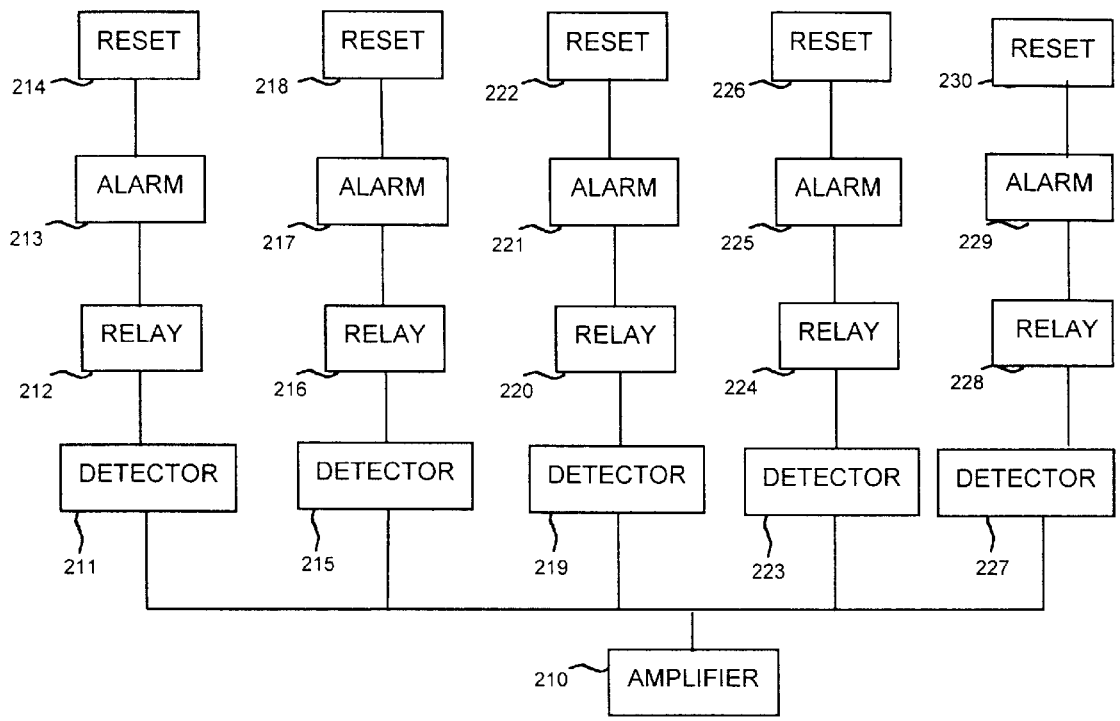
FIG. 8 is an exemplary circuit for receiving a low battery strength level from the animal's collar in accordance with the present invention.

FIG. 8 is an exemplary circuit for receiving the low battery strength signal (D) at the home base 1. An amplifier 210, which is the same as amplifier 32 in the circuit of FIG. 2, amplifies signal (D) up to 100 times, so as to energize the remainder of the circuit. A detector 211 is only activated by the modulated signal (D). Once the circuit verifies the intensity of signal (D) (a strength of between 0.001 and 0.005 watts) and the predetermined modulation level of signal (D) (between 0.01 kHz and 0.05 kHz), a relay 212 activates an alarm 213 to alert the owner of the low battery level in the animal's receiver 11.

As mentioned above, an aspect of this invention is that it is possible to utilize a configuration capable of indicating the imminent power failure of a particular animal's receiver 11 when more than one animal is confined in the same area. In this arrangement, the low battery strength signal (D) produced by each animal's receiver 11 will have a different level of modulation on signal (D). Whereas the detector 211 is searching for signal (D) with a modulation of between 0.01 kHz and 0.05 kHz, for example, a detector 215 may be searching for signal (D) with a modulation of between 0.06 kHz and 0.1 kHz, a detector 219 may be searching for signal (D) with a modulation of between 0.11 kHz and 0.15 kHz, a detector 223 may be searching for signal (D) with a modulation of between 0.16 kHz and 0.20 kHz, and a detector 227 may be searching for signal (D) with a modulation of between 0.21 kHz and 0.25 kHz.

Alarms 213, 217, 221, 225, and 229 are visible alarms such as light emitting diodes or flashing lights and/or audible alarms such as buzzers or whistles. Resets 214, 218, 222, 226, and 230 allow the user to deactivate the home base 1 alarms and reset the alarm and activate relays 212, 216, 220, 224 and 228 to a normal ready position.

In addition, although we have disclosed only a single modulated signal to be demodulated and compared at the receiver 11 of collar 9 for signal (A) for certain of the aforementioned embodiments, a plurality of modulating signals for modulating the carrier signal could be transmitted in signal (A) or from another confinement system and received, one modulating signal corresponding to a different animal, to make the system workable for a plurality of animals.

Finally, although the detectors are activated by first and second strength levels between 0.001–0.005 and 0.01–0.05 watts, other strength levels could be used.

Figure 9:
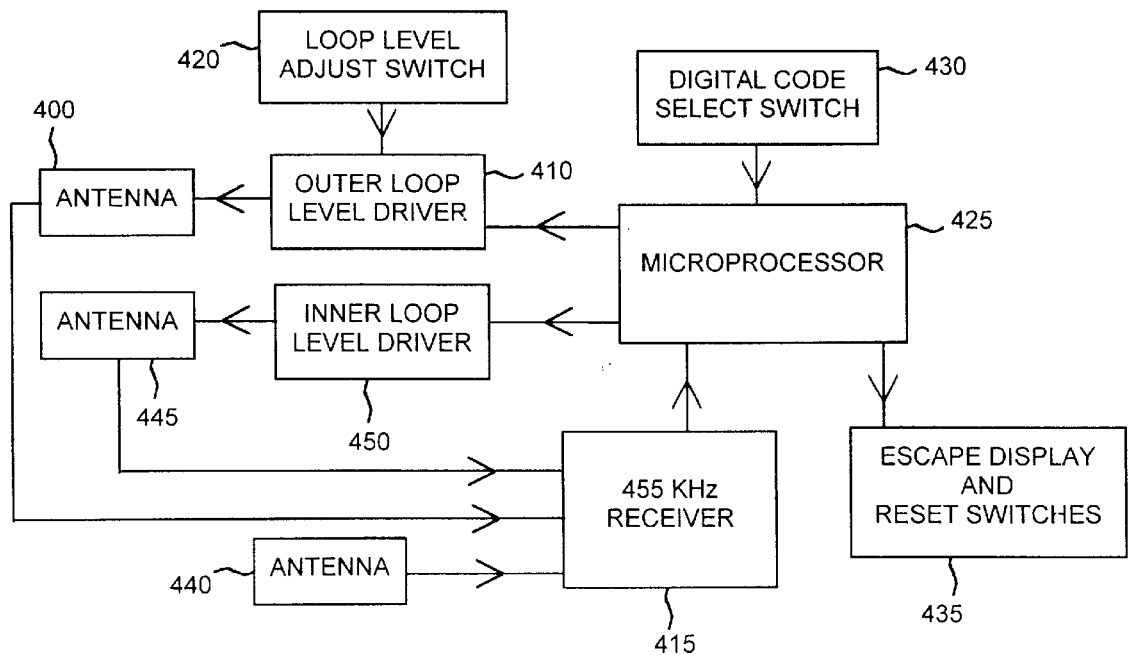
FIG. 9 is another exemplary circuit of a home base transmitter and alarm circuit utilizing a microprocessor in accordance with the present invention.
Figure 10:
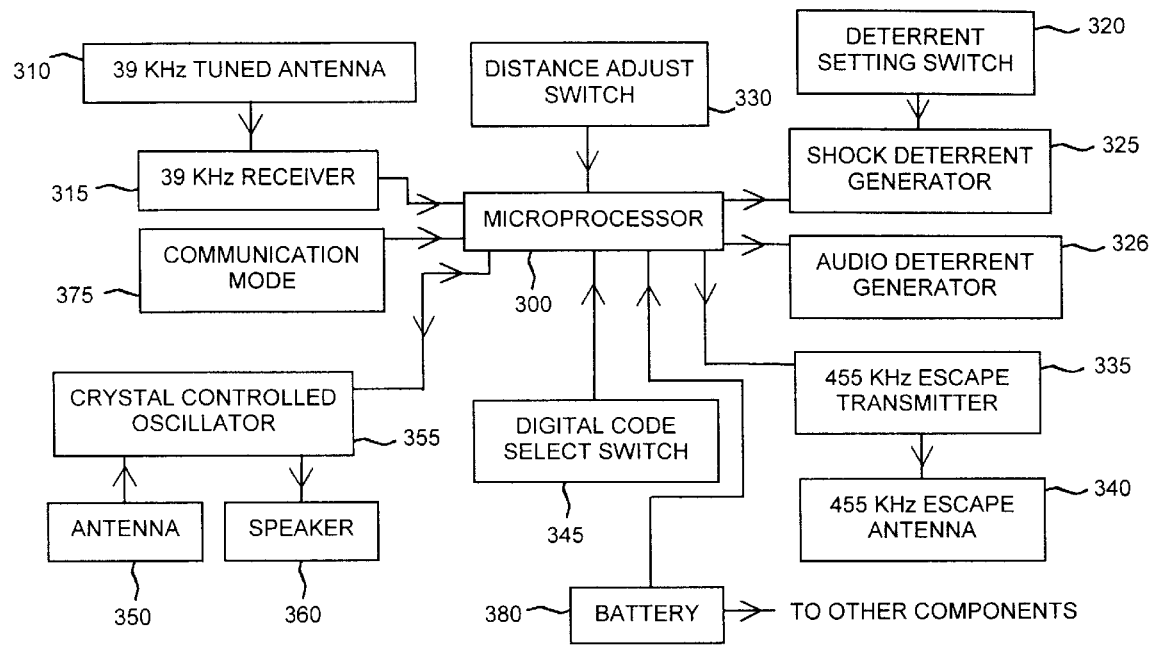
FIG. 10 is another exemplary circuit for a receiver utilizing a microprocessor in accordance with the present invention.

Another exemplary embodiment is shown in FIGS. 9 and 10. FIG. 9 is an alternate exemplary embodiment for the home base transmitter shown in FIG. 2. FIG. 10 is an alternate exemplary embodiment for receiver 11 shown in FIG. 3.

The embodiment shown in FIGS. 9 and 10 encodes the signals transmitted between the home base transmitter and the receiver 11 using a binary coded pulse sequence, a digital signal. Each receiver 11 is assigned one of a plurality of different binary coded pulse sequences as receiver identifiers. The binary codes are used to identify a particular receiver 11. Signals transmitted by receiver 11 are encoded with the binary code. The home base transmitter removes the binary code from the transmitted signal to identify which receiver 11 transmitted the signal. In this way, different receivers 11 can transmit on the same frequency.

For example, when an animal 7 escapes from the confinement area, the receiver 11 transmits a signal encoded with the binary code. The home base transmitter receives the encoded signal, removes the binary code, and activates an alarm. The home base transmitter also identifies which animal has escaped the confinement area.

Each home base transmitter also has a binary code pulse sequence which is added to the first, predetermined modulated signal (A). The binary code is used as a fence address. Receiver 11 receives the encoded signal (A) and removes the binary code. Receiver 11 is only responsive to the received encoded signal (A) which contains the fence address assigned to that particular receiver 11. Otherwise, receiver 11 is not responsive to the received encoded signal (A).

The microprocessor 425, shown in FIG. 9, controls the home base transmitter. Microprocessor 425 generates a binary coded pulse sequence which is added to the first, predetermined modulated signal (A) which is also generated by microprocessor 425. The microprocessor can be adjusted to transmit different binary coded pulse sequences using digital code select switch 430. The use of different binary coded pulse sequences allows multiple adjacent electronic confinement systems to operate at the same time.

Encoded signal (A) has a frequency of about 38.4 kHz. Encoded signal (A) is provided to outer loop level driver 410 which is a MOSFET high current driver. The outer loop level driver drives the antenna 400 to transmit the encoded signal (A). Antenna 400 corresponds to the first signal-emitting wire 3. The signal level produced by outer loop level driver 410 can be adjusted using loop level adjust switch 420.

Similarly, microprocessor 425 produces the second, predetermined modulated signal (B). Signal (B) is provided to the inner loop driver 450 which is a MOSFET high current driver. The inner loop level driver drives the antenna 445 to transmit signal (B). Antenna 445 corresponds to the second signal-emitting wire 5.

Figure 13:
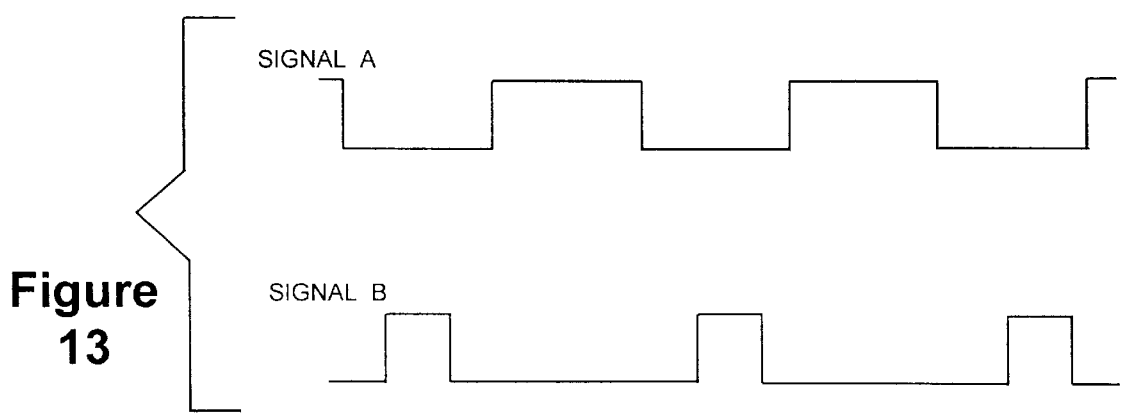
FIG. 13 is a signal diagram illustrating the signals transmitted by the home base transmitter shown in FIG. 9.

Microprocessor 425 modulates signals (A) and (B) as shown in FIG. 13. When modulated signal (A) is "on," modulated signal (B) is "off." When modulated signal (B) is "on," modulated signal A is "off." The time during which modulated signals (A) and (B) are "on" is different. Based on the difference in modulation, it can be determined if the received signal is signal (A) or signal (B). As a result, only one receiver tuned to a particular frequency is needed to receive both signals (A) and (B). Thus, the size of receiver 11 is minimized.

The home base transmitter also includes a 455 kHz receiver 415 which demodulates signals from antennas 400, 440, and 445. Antenna 440 is disposed in close proximity to the home base transmitter to detect transmissions from receiver 11 when the animal 7 is in close proximity to the home base transmitter. The 455 kHz receiver 415 is a Phillips NE614 receiver integrated circuit. The signals received by antennas 400, 440, and 445 are transmitted from receiver 11 and include binary codes having a rate of 1200 baud. The transmitted signals indicate whether animal 7 has left the confinement area or whether the battery 380, shown in FIG. 10, is at a low level.

Figure 11:
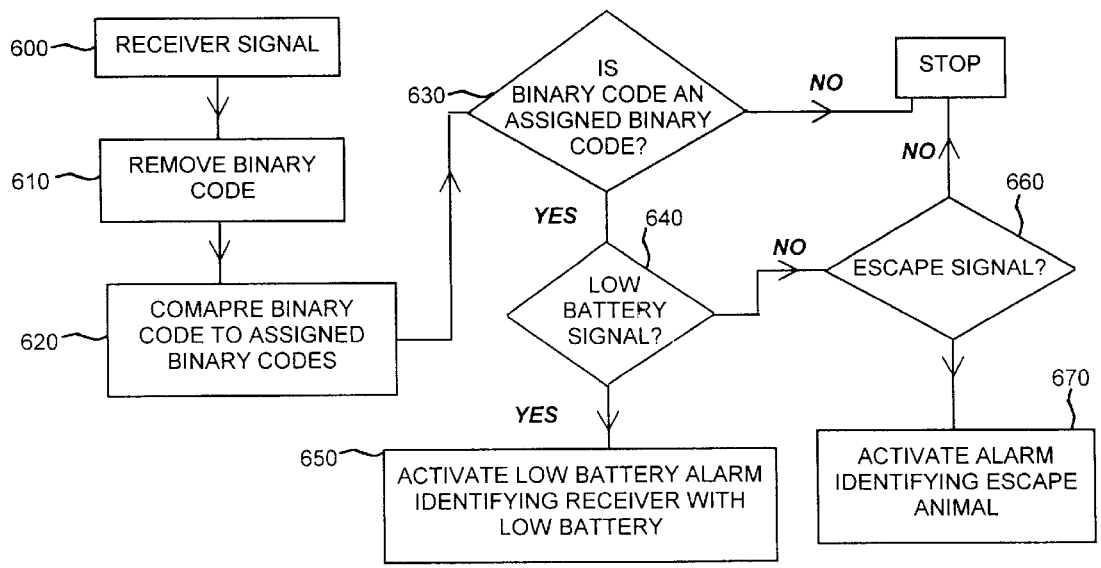
FIG. 11 is a flow chart illustrating the operation of the microprocessor in the home base transmitter shown in FIG. 9.

The operation of microprocessor 425 when receiving a signal from the home base transmitter is explained below with reference to FIGS. 9 and 11. The demodulated signal is provided, at step 600, to microprocessor 425 from 455 kHz receiver 415. Then, at step 610, the microprocessor 425 removes the binary code from the demodulated signal and compares, at step 620, the binary code to assigned binary codes. Microprocessor 415 has a table which includes a list of binary codes identifying the receivers assigned to that base station. The binary codes in the table are the assigned binary codes. Microprocessor 425 terminates processing if it is determined, at step 630, that the binary code from the received signal is not one of the assigned binary codes.

If the binary code is one of the assigned binary codes, microprocessor 425 determines, at step 640, whether the received signal has been transmitted because the battery 380, shown in FIG. 10, is low. The low battery alarm is activated, at step 650, if the signal indicates a low battery in receiver 11. The microprocessor also provides data to a display (not shown) to display which receiver 11 has the low battery 380.

Alternatively, if the signal does not indicate a low battery level, the microprocessor determines, at step 660, if the received signal indicates that animal 7 has escaped. Microprocessor 425 activates an alarm and displays a message on a 4 line, 16 character liquid crystal display on escape display and reset switches 435 shown in FIG. 9, at step 670, to identify which receiver 11 transmitted the digital code. This data is used to identify which animal 7 has escaped.

Figure 12:
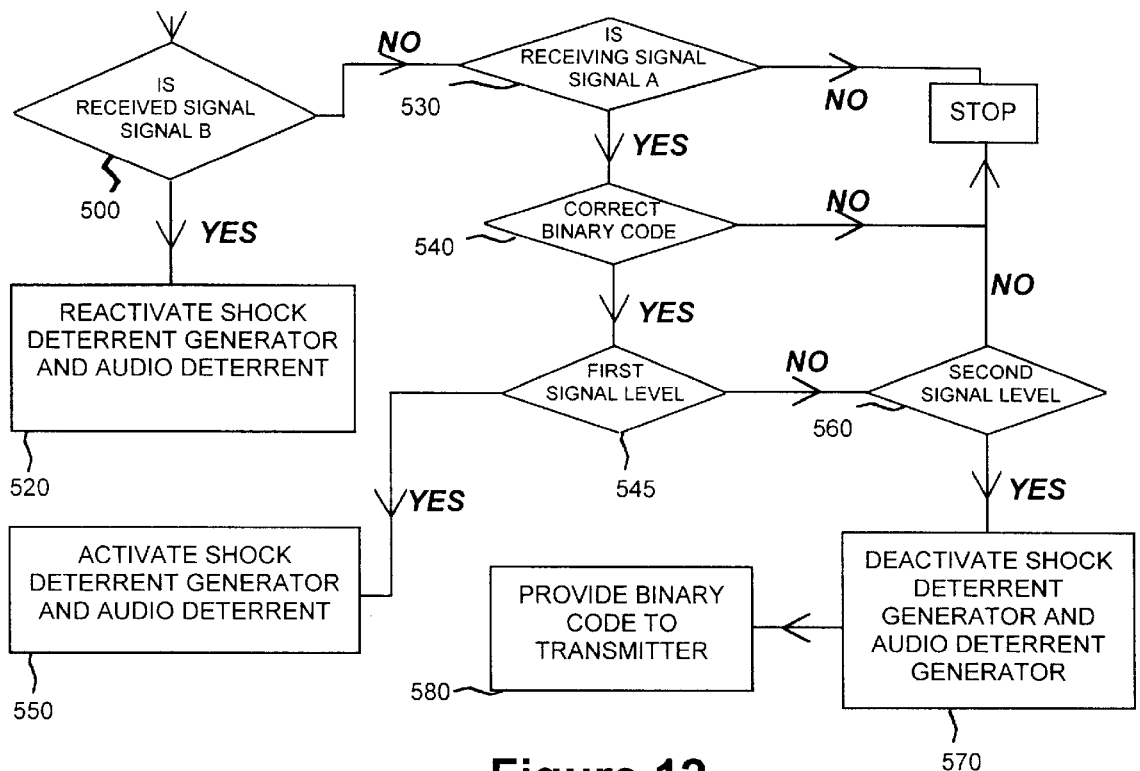
FIG. 12 is a flow chart illustrating the operation of the microprocessor in the receiver shown in FIG. 10.

Receiver 11 is explained below with reference to FIGS. 10 and 12. Receiver 11, as shown in FIG. 1, has a 39 kHz LC tuned antenna 310 which receives signals (A) and (B) from the home base transmitter. The antenna comprises an inductor wrapped on a ferrite core resonating with a capacitor. The received signal is provided to 39 kHz receiver 315 which demodulates and detects the strength level of the received signal, signal (A) or (B). In addition, 39 kHz receiver removes the binary code from demodulated signal (A'). 39 kHz receiver 315 provides the strength levels from signal (A) and (B) and the binary code from signal (A) to microprocessor 300. 39 kHz receiver 315 also identifies which signal, Signal (A) or (B), has been received. This data is provided to microprocessor 300.

Microprocessor 300 determines, at step 500, if the received signal is signal (B). If signal (B) has been received, shock deterrent generator 325 and the audio deterrent generator 326 are reactivated at step 520.

If the received signal is not signal (B), it is determined, at step 530, if the transmitted signal is signal (A). Next, it is determined, at step 540, whether the binary code from the signal corresponds to the fence address for receiver 11. The fence address is stored in the microprocessor. The binary code for the fence address can be changed between, for example, three different binary codes using digital code select switch 345. If the binary code is the correct fence address, then it is determined, at step 545, whether the signal strength of the received signal is at the level, between 0.001 and 0.005 watts, to initiate activation of the shock deterrent generator 325 and audio deterrent generator 326 at step 550. The deterrent level applied by the shock deterrent generator 325 to animal 7 can be adjusted using deterrent setting switch 320. If the level is correct, step 550 is initiated. If the signal level is not correct, it is then determined, at step 560, whether the signal strength is at a level, between 0.01 and 0.05 watts, to initiate, at step 570, deactivation of the shock deterrent generator 325 and audio deterrent generator 326. If neither level is satisfied, processing is terminated by microprocessor 300. In addition, if the correct binary code is not received or if the received signal is not signal (A), the microprocessor terminates processing.

The first and second signal strength levels can be adjusted using distance adjust switch 330. In addition, the strength of the shock deterrent can be adjusted using the deterrent setting switch.

Microprocessor 300 also provides a binary code to 455 kHz escape transmitter 335, at step 580, if animal 7 leaves the confinement area. 455 kHz escape transmitter 335 encodes a modulated signal which is transmitted from the receiver 11 via 455 kHz escape antenna 340 using the binary code. The home base transmitter, as discussed above, detects the transmitted signal, removes the binary code and displays which animal 7 has escaped as well as sounding an alarm.

Receiver 11 also includes an antenna 350, crystal controlled oscillator 355, and a speaker 360 for receiving voice transmissions from the home base transmitter or a portable transmitter as explained above. Crystal controlled oscillator 355 is controlled by microprocessor 300 to control the amount of power consumed. The voice receiver is either deactivated, activated on a periodic basis, or activated all the time. These three modes are selected by the microprocessor 300 in response to the switching of communication mode switch 375.

Figure 14:
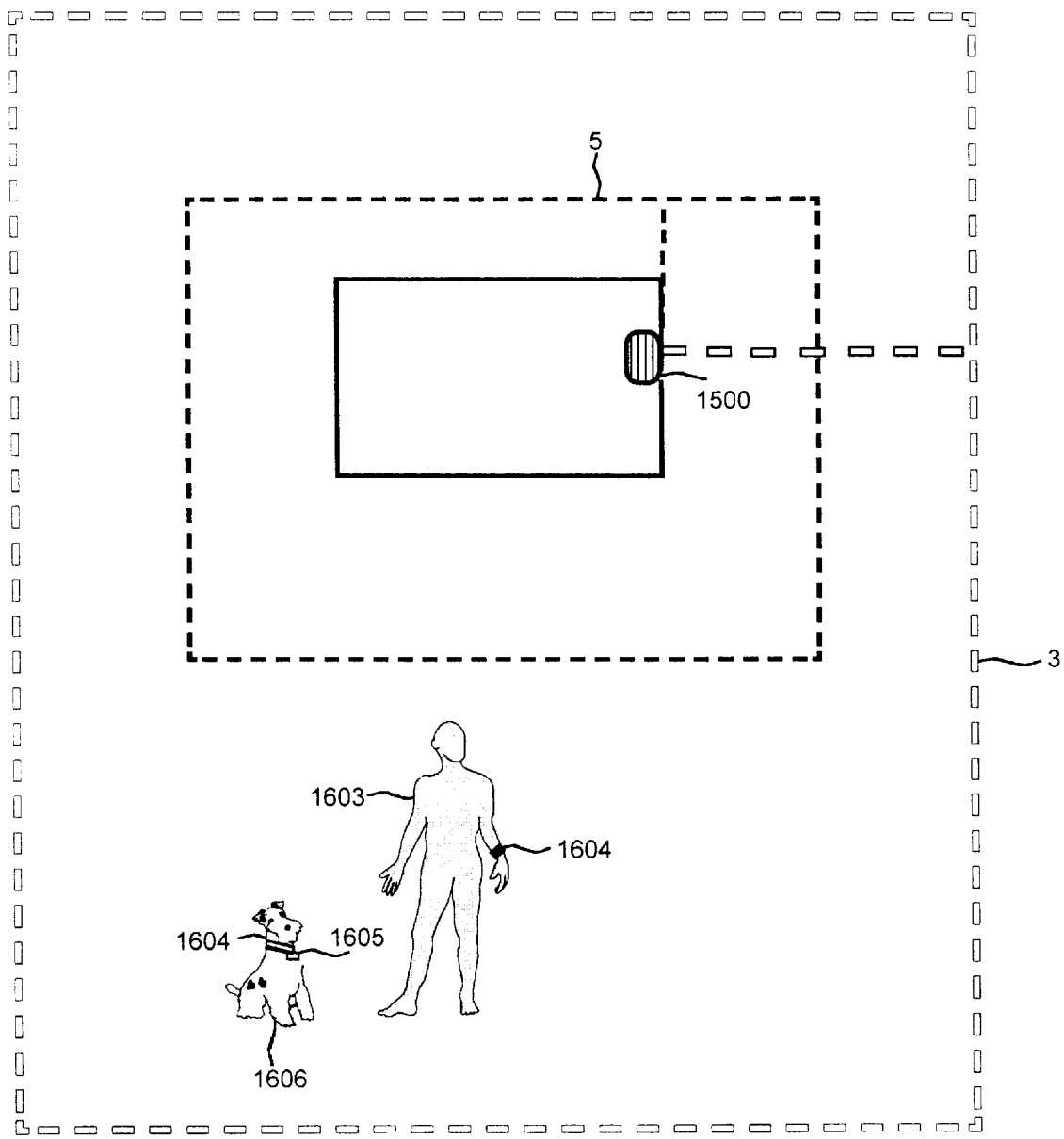
FIG. 14 is a schematic diagram illustrating another exemplary electronic confinement system for animals or people in accordance with the present invention.

FIGS. 14–19 illustrate another alternative embodiment of the present invention. Referring to FIG. 14, home base 1500 transmits a 38.4 kHz signal carrying a first predetermined digitized word, shown in FIG. 17, on a partially modulated signal, shown in FIG. 19, from a first signal-emitting wire 3. Home base 1500 also transmits a 38.4 kHz signal carrying a second predetermined digitized word on a second partially modulated signal from a second signal-emitting wire 5. The first and second predetermined words are each eight bits. The signals transmitted from wires 3 and 5 are received by transceivers 1604 which are attached to person 1603 and/or animal 1606 via a belt, band, collar 1605, or harness.

Figure 15:
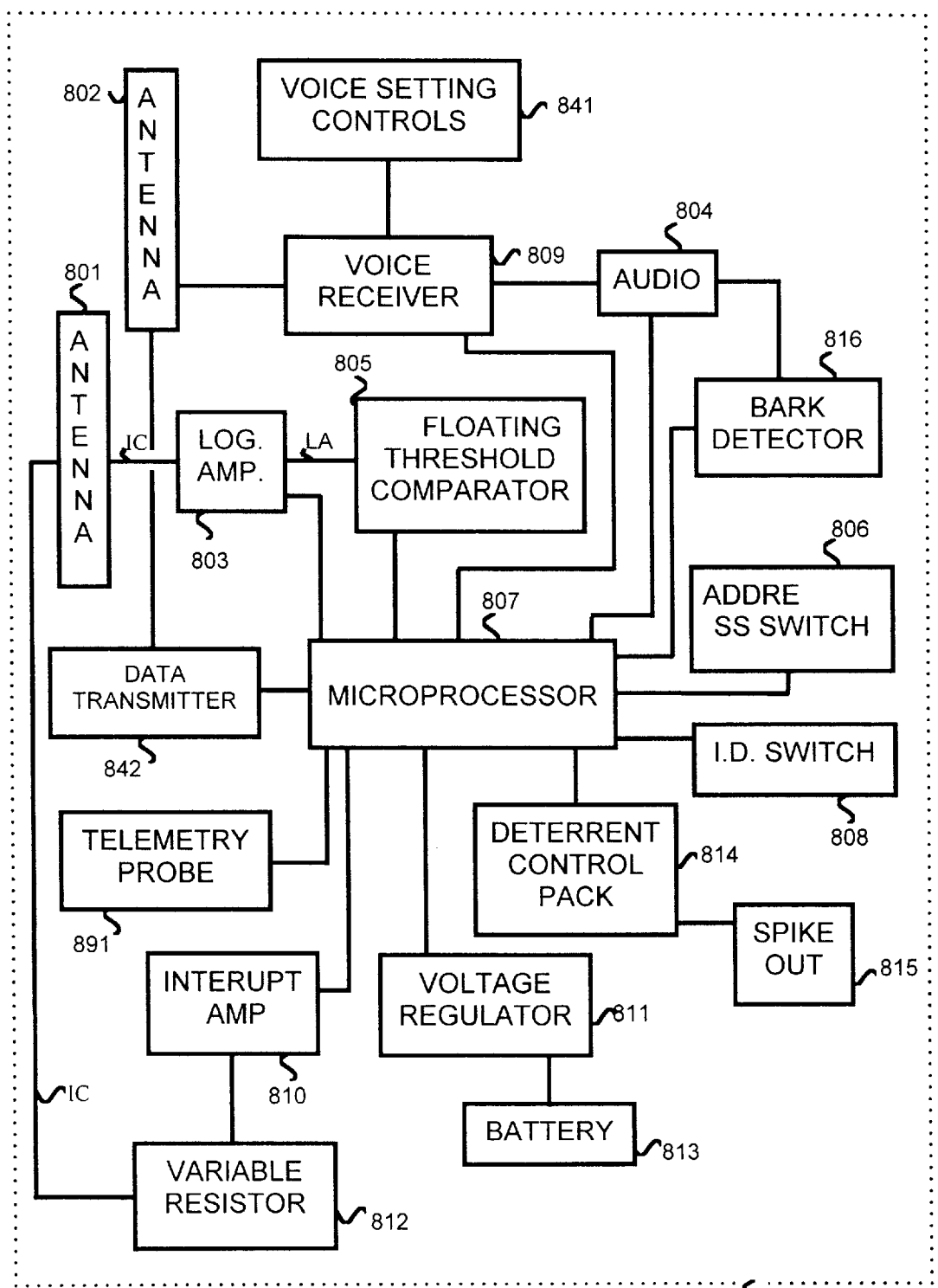
FIG. 15 is an exemplary circuit of the transceiver worn by the animal or person shown in FIG. 14.

FIG. 15 is a detailed block diagram of transceiver 1604. The 38.4 kHz signal emitted from wire 3 induces an electric current in antenna 801 which is sensitive only to a partially modulated signal of about 38.4 kHz. Antenna 801 is coupled to variable resistor 812 and log amplifier 803. Variable resistor 812 is coupled to interrupt amplifier 810 to effectively adjust the gain of interrupt amplifier 810 to increase or decrease the signal level of the signal "IC" provided from antenna 801. When the amplified signal "AS" reaches a specified threshold, microprocessor 807 is interrupted. As a result, microprocessor 807 is switched to a "wake" mode from a "sleep" mode.

Microprocessor 807 is switched between the "wake" mode and the "sleep" mode to conserve energy. In wake mode, microprocessor 807 is activated to perform different operations described below. In sleep mode, microprocessor 807 is in a low power operational mode to conserve the energy of battery 813. A suitable microprocessor 807 is a MICROCHIP Corporation microprocessor Part No. PIC16C71.

After microprocessor 807 is switched to wake mode, microprocessor 807 reads ID switch 808. ID switch 808 is set for a particular transceiver identification. Microprocessor 807 uses the transceiver identification set at ID switch 808 to identify the transceiver 1604 worn by the animal or person when the transceiver 1604 transmits data to the home base 1500.

Log amplifier 803 generates a voltage proportional to the signal level of signal IC provided from antenna 801. Microprocessor 807 measures the voltage produced by log amplifier 803 when microprocessor 807 is in the wake mode. Microprocessor 807 uses the measured voltage to determine the approximate distance transceiver 1604 is from wire 3. The measured voltage increases as transceiver 1604 is moved closer to wire 3 and decreases as transceiver 1604 is moved away from the wire. If the measured voltage from log amplifier 803 is above a specified level, microprocessor 807 continues to monitor the voltage produced by log amplifier 803. Microprocessor 807 continues to monitor log amplifier 803 to determine (1) if and when to deliver the deterrent to the animal or person and (2) whether the animal or person has escaped the predetermined confinement area. When the voltage produced by log amplifier 803 drops below the specified threshold, microprocessor 807 switches to the sleep mode. Alternatively, microprocessor 807 can be instructed to remain in wake mode to perform other operations such as monitoring the vital signs of the animal or person as discussed below.

Figure 17:
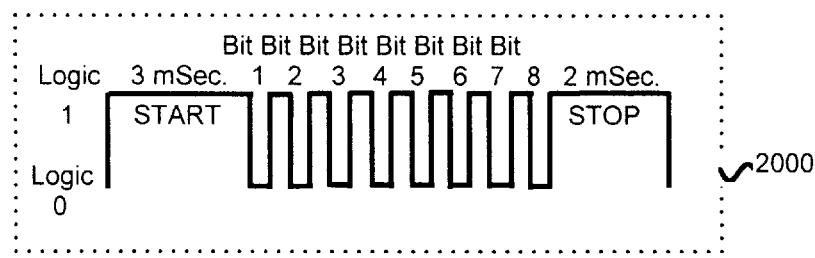
FIG. 17 is a data diagram illustrating the format of the 8-bit serial data word transmitted by the transceiver and the home base shown in FIG. 14.

Floating threshold comparator 805 removes the first predetermined word, shown in FIG. 17, from second amplified signal "LA." Floating threshold comparator 805 may be a Phillips TSSOP Package NE604 or NE614. The arrangement of the first predetermined word transmitted from wire 3 by home base 1500, shown in FIG. 14, is shown in Table 1 below.

TABLE 1

| BIT | USE OF BIT |
|---|---|
| 0 | First address fence bit |
| 1 | Second address fence bit |
| 2 | Not used |
| 3 | Not used |
| 4 | Indicates signal is transmitted from wire 3 "Welcome Home Bit" |
| 5 | Enables voice receiver 809 |
| 6 | Activates/Enables bark deterrent |
| 7 | Not used |

The 8-bit serial data word contains a fence address specified by two bits, a bit to indicate whether the 8-bit serial data word was transmitted from wire 3 or wire 5, a bit indicating whether a bark deterrent is to be administrated or to enable the bark deterrent, and a bit to activate voice receiver 809.

In addition, other bits could be used to activate or deactivate components in transceiver 1604. For example, the telemetry probe 891, the deterrent control pack 814, the audio level of audio 804, the bark deterrent using bark detector 816, and the voice receiver 809 can be activated, deactivated, or adjusted. Microprocessor 807 can be programmed to control these different components in response to data contained in the first and second predetermined words. These components are described below.

As is shown in FIG. 17, the first predetermined word has a 3 millisecond start pulse followed by eight one millisecond bit periods. Each bit period is divided into two 500 microsecond halves, the first half being always low and the second half being low for a logic zero, and high for a logic one. A two millisecond stop pulse follows the eight one millisecond bit periods. Timing for the predetermined word is produced in response to crystal 826, shown in FIG. 16. Any amount of time can be assigned to the start pulse, stop pulse, or bit periods.

The first predetermined word is provided to microprocessor 807 which determines whether the received data is valid. The first determined word is determined to be valid if the received word includes the three millisecond start pulse or the two millisecond stop pulse. Alternatively, one more of the eight bits of the 8-bit word can be used to determine whether the first predetermined word is valid using error checking as is known in the art.

If received data is invalid, microprocessor 807 powers down to the sleep mode. If the data is valid, microprocessor 807 next determines whether the correct fence address is received. As is shown in Table 1 above, the fence address is two bits. Thus, four different fence addresses can be specified using the two bits. These are [0,0], [0,1], [1,0], and [1,1]. Microprocessor 807 is responsive to one of the four possible fence addresses, for example, [1,1]. The fence address to which microprocessor 807 is responsive is set using address switch 806. If an address other than the one selected by address switch 806 is received, microprocessor 807 switches to the sleep mode.

Figure 20:
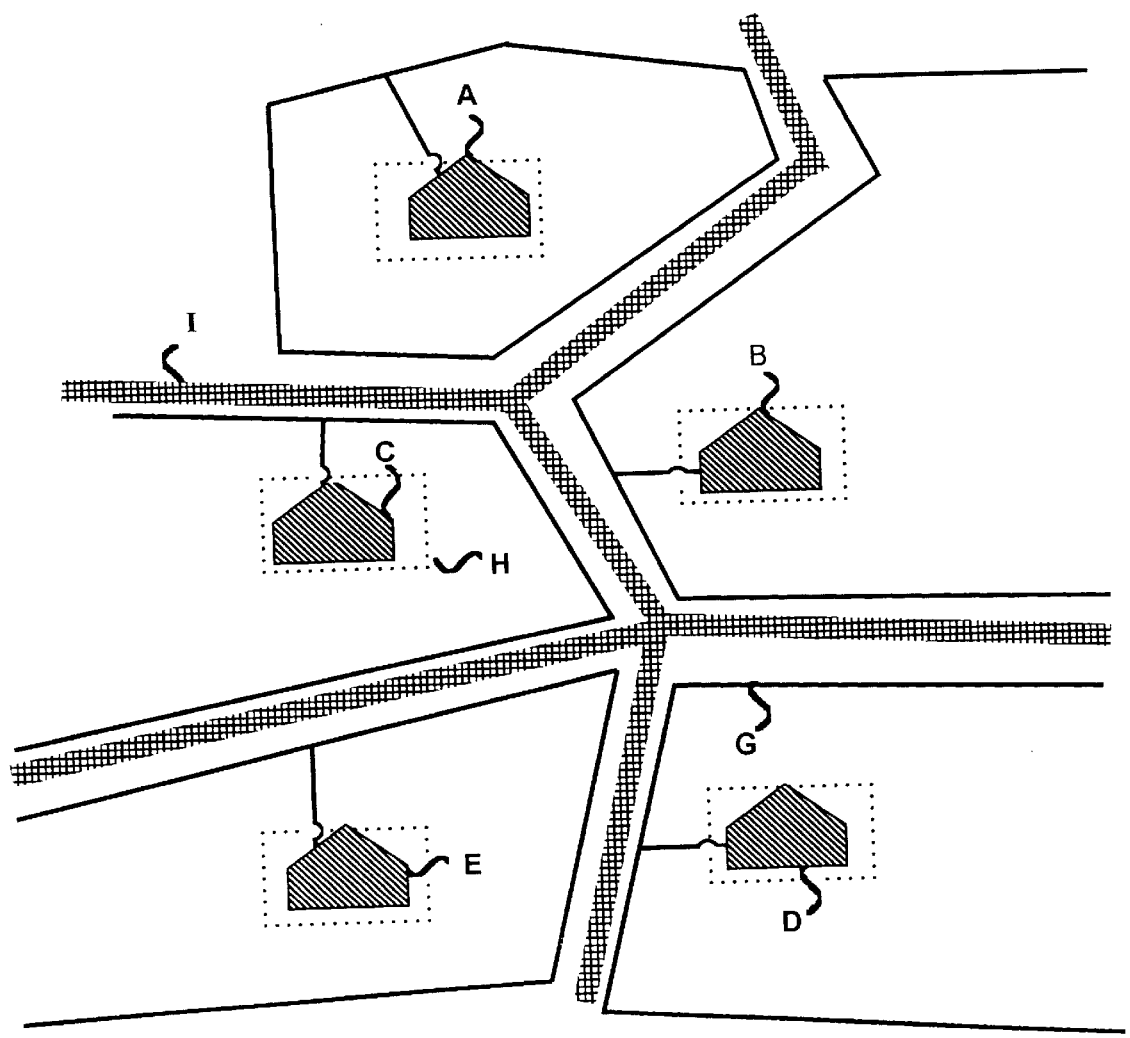
FIG. 20 is a schematic diagram illustrating the proximity of adjacent electronic containment systems in accordance with the present invention.

By using different fence addresses, multiple adjacent systems, as shown in FIG. 20, can run simultaneously because transceiver 1604 can be set to respond only to one fence address transmitted from one home base 1500, shown in FIG. 14. In FIG. 20, home base 1500 units would be located in houses "A", "B", "C", "D", and "E". Line "G" illustrates the outer perimeter containment wires, wire 3. Line "H" illustrates the inner recapture antenna wires, wire 5. Line "I" illustrates the property lines of the adjacent homes. More then eight bits of data can be transmitted in the first predetermined word from home base 1500 and received by transceiver 1604. As a result, more than two bits can be used as the fence address allowing for a large number of fence addresses and adjacent systems.

After microprocessor 807 has determined that the received data contains the correct fence address, microprocessor 807 reads ID switch 808 and saves the read value.

Returning to FIG. 15, microprocessor 807 initiates an audio deterrent via audio 804 if the animal or person moves too close to wire 3. In addition, microprocessor 807 initiates a shock deterrent via deterrent control pack 814 and spike out 815 if the animal or person moves too close to wire 3. Microprocessor 807 controls the intensity of the shock deterrent administered to the animal using deterrent control pack 814. The intensity of the shock deterrent is increased from no shock deterrent to a predetermined maximum shock deterrent. The level of the audio deterrent can also be adjusted.

The intensity of the shock deterrent and the level of the audio deterrent can be set remotely using the first and second predetermined data words. One or more of the bits in the first and second predetermined data words can be designated for providing data values to establish the intensity of the shock deterrent and the level of the audio deterrent. In response to the received first and second predetermined data words, microprocessor 807 adjusts the intensity of the shock deterrent and the level of the audio deterrent.

Each time the audio deterrent or the shock deterrent are activated, microprocessor 807 can be programmed to transmit data values in the transceiver data word indicating that the audio or the shock deterrent has been administered to the person or animal. The transceiver data word is described in greater detail below.

Transceiver 1604 can include the audio deterrent or the shock deterrent or both. The audio and shock deterrents can be removed from the transceiver or rendered inoperative. In addition, the shock deterrent and the audio deterrent can both be removed or rendered inoperative when transceiver 1604 is used to monitor the status of the person 1603 or the animal 1606 and not to prevent escape from the predetermined confinement area.

Microprocessor 807 also determines whether the animal 1606 or person 1603 wearing transceiver 1604 has ignored the audio and shock deterrents and has escaped. When an animal 1606 or person 1603 escapes, microprocessor 807 disables audio 804 and spike out 815 so that a deterrent cannot be administered when the animal or the person approaches wire 3. Thus, the animal 1606 or the person 1603 can return to the predetermined confinement area defined by wire 3 without having a deterrent applied. After the animal 1606 or person 1603 has escaped, microprocessor 807 transmits a signal to home base 1500 and enters the sleep mod. The signal transmitted from transceiver 1604 is described below.

When animal 1606 or person 1603 returns and approaches wire 3, shown in FIG. 14, transceiver 1604 worn by animal 1606 or person 1603 enters a wake mode in a passive state. When microprocessor 807 is in the passive state, a deterrent will not be administered to animal 1606 or person 1603. Thus, the animal 1606 or the person 1603 can approach and cross over wire 3. Microprocessor 807 switches to the sleep mode if the transceiver 1604 is moved away from wire 3 within the predetermined confinement area and if the received signal falls below the predetermined threshold. As the animal 1603 or person 1603 approaches wire 5, shown in FIG. 14, transceiver 1604 worn by the animal 1606 or person 1603 enters the wake mode.

Transceiver 1604 operates in the same manner in response to the signal transmitted from wire 5 except that the format of the second predetermined word is different from the first predetermined word as is shown in Table 1 above. The second predetermined word contains a logic one as the Welcome Home Bit and the first predetermined word contains a logic zero as the Welcome Home Bit. The Welcome Home Bit is used by transceiver 1604 to distinguish the signals transmitted from wires 3 and 5. In response to the Welcome Home Bit, microprocessor 807 is reset to enable the deterrent circuitry including audio 804 and spike out 815.

Microprocessor 807 generates an 8-bit transceiver serial data word which is transmitted to home base 1500 via wire 3 which receives the transmitted data. The transceiver data word has the same format as the first and second predetermined words shown in FIG. 17. Microprocessor 807 produces the transceiver data word which is provided to data transmitter 842 which encodes a 455 kHz carrier signal with the transceiver data word. The encoded signal is transmitted from antenna 802.

The arrangement of the transceiver data word transmitted from transceiver 1604 is shown in Table 2 below.

TABLE 2

| BIT | USE OF BIT |
| --- | --- |
| 0 | First ID of transceiver 1604 |
| 1 | Second ID of transceiver 1604 |
| 2 | Not used |
| 3 | Set for error correction |
| 4 | Indicates whether the animal's 1606 or person's 1603 vital signs are not within specified parameters |
| 5 | Set for error correction |
| 6 | Indicates whether the animal 1606 or person 1603 has escaped |
| 7 | Indicates whether battery 813 in transceiver 1604 is low |

Bits zero and one of the transceiver data word identify which transceiver 1604 is transmitting. Home base 1500, shown in FIG. 14, identifies which transceiver 1604 is transmitting using the two bit code. Bits three and five are used for error correction of the transceiver data word as is known. Bit four indicates whether the vital signs of the animal or person are with acceptable parameters. For example, if telemetry probe 891, as described below, determines that the animal's or person's pulse is not within a predetermined acceptable range, bit four is transmitted as a logic 1 in the transceiver data word. Home base 1500 activates an alarm in response to bit four set as a logic one.

Bit six indicates whether the animal 1606 or person 1603 has escaped from the predetermined confinement area defined by wire 3. Bit seven indicates whether battery 813 is providing an acceptable level of power. Bit seven is transmitted as a logic one if the power level of battery 813 is not acceptable. Home base 1500 activates an alarm to indicate that battery 813 is not providing an acceptable level of energy. Bit two could be used to indicate whether an audio or a shock deterrent has been administered to the animal or person.

After the data word is transmitted to home base 1500, microprocessor 807 enables voice receiver 809 and audio 804 in response to voice setting controls 841. Voice setting controls 841 can be switched to allow activation of voice receiver 809 and audio 804 when a signal command is received from home base 1500, or when the animal 1606 or the person 1603 has escaped, or never. Voice receiver 809 is activated in response to bit 5 of the first predetermined word or the second predetermined word, shown in Table 1, transmitted from home base 1500.

Microprocessor 807 also performs other operations in response to the bit settings of the first predetermined word and the second predetermined word. When bit five of the first predetermined word or the second predetermined word is a logic one, microprocessor 807 enables voice receiver 809. Voice receiver 809 is coupled to antenna 802 to receive an audio transmission from the home base 1500 or a hand-held radio. Voice receiver 809 converts the audio transmission so that it can be played on audio speaker 804. Thus, a user can communicate via voice to the animal or person. Voice receiver 809 may be a Phillips TSSOP Package NE605. The voice receiver 809 is enabled as long as the first predetermined word or the second predetermined word is received with a logic one as bit five. Voice receiver 809 is deactivated when bit five is changed to a logic zero or when the first predetermined word or the second predetermined word is no longer received.

When bit six of the first predetermined word or the second predetermined word is a logic one, microprocessor 807 enables bark detector 816. When the bark detector 816 is enabled, a shock will be administered to the animal 1606 by spike out 815 at a level selected by deterrent control pack 814 whenever the animal barks. When an animal barks, the sound is received by audio 804 which converts the sound into a signal which is provided to bark detector 816. Bark detector 816 determines whether the animal 1606 is barking. Bark detector 816 determining whether animal is barking by determining whether the sound received by audio 804 has exceeded a specified decibel level. Bark detector 816 provides a signal to microprocessor 807 when the specified decibel level is exceeded. In response to this signal, microprocessor 807 administers a deterrent to the animal via deterrent control pack 814 and spike out 815. The bark deterrent is deactivated when bit five is changed to a logic zero or when the first predetermined word or the second predetermined word is no longer received.

Telemetry probe 891 is coupled to microprocessor 807 and used to gather data such as body temperature, pulse, and other critical biological data from the animal 1606 or person 1603 wearing transceiver 1604. Telemetry probe 891 is, for example, a MEDITEC probe part number TEL422. Telemetry probe 891 measures the pulse and temperature of the animal or person and the moisture on the animal's or person's skin. Telemetry probe 891 provides telemetry data which includes the measured vital signs. Microprocessor 807 determines whether the telemetry data from telemetry probe 891 is within specified parameters. Different specified parameters are selected for different animals or people.

For example, the temperature parameter for a person can be set at 100° F. If telemetry probe 891 measures a temperature in excess of 100° F., for example, 101° F., microprocessor 807 sets bit 4 of the transceiver data word shown in Table 2 as a logic one. A logic one indicates that the vital signs are not within normal parameters. In addition to specifying that the animal's or person's vital signs are not within normal parameters, other bits in the transceiver data word can be used to indicate which of the vital signs are not within normal parameters. Alternatively, the animal's or person's vital signs can be transmitted to the home base 1500.

Transceiver 1604 can also transmit the animal's or person's vital signs in response to a bit setting in the first predetermined word or the second predetermined word transmitted from home base 1500. One of the eight bits, for example bit 7, of the transceiver data word shown in Table 1 is set at a logic one. In response to bit 7 set at a logic one, microprocessor 807 determines whether the animal's or person's vital signs are within normal parameters. The result of the determination is transmitted to home base 1500. The animal's or person's actual measured vital signs could also be transmitted to home base 1500.

Transceiver 1604 is powered by battery 813 in combination with voltage regulator 811. Voltage regulator 811 provides a constant voltage to microprocessor 807 and the other components in transceiver 1604. The interconnections of battery 813 and the other components in transceiver 1604 have been omitted for clarity of FIG. 15. The components of transceiver 1604 are activated and controlled using microprocessor 807. Microprocessor 807 may be a MICROCHIP Corporation microprocessor Part No. PIC16C71-20-/SO. Microprocessor 807 remains in the sleep mode until it is switched to the wake mode in response to signal AS from interrupt amplifier 810. As a result, energy use is minimized.

Figure 16:
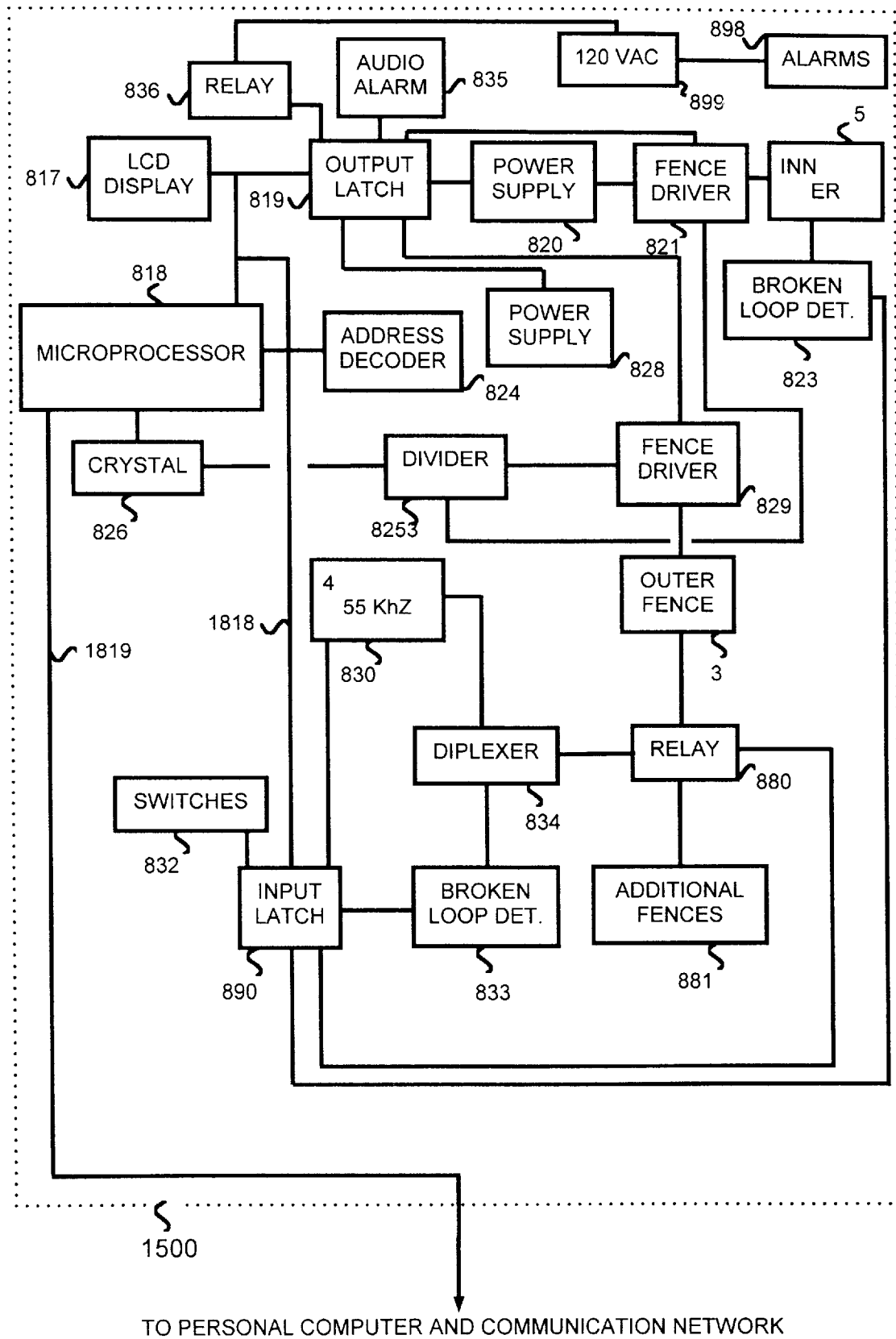
FIG. 16 is an exemplary circuit of a home base shown in FIG. 14.

A block diagram of the home base 1500 is shown in FIG. 16. Microprocessor 818 is coupled to LCD display 817, output latch 819, address decoder 824, and input latch 890 via bus 1818. Microprocessor 818 uses address decoder 824 to produce an address to access data stored in input latch 890 and output latch 819.

Upon power up, microprocessor 818 initializes LCD display 817, output latch 819, and address decoder 824. After initialization is complete, microprocessor 818 determines if there is a break in wire 3 or wire 5. Broken loop detector 823 is coupled to wire 5 and broken loop detector 833 is coupled to wire 3 through diplexer 834. Diplexer 834 separates signals transmitted to wire 3 from signals transmitted from wire 3. The signal transmitted from wire 3 is provided to broken loop detector 833.

Broken loop detector 823 detects the signal generated by fence driver 821 on wire 5 and broken loop detector 833 detects the signal generated by fence driver 829 on wire 3. When broken loop detector 823 does not detect a signal generated by fence driver 821 a fault condition is generated. When broken loop detector 833 does not detect a signal generated by fence driver 829 a fault condition is generated. The fault condition generated by broken loop detector 833 or broken loop detector 823 is stored in input latch 890. A break may exist in wire 3 if broken loop detector 823 does not detect a signal on wire 3 generated by fence driver 821. A break may exist in wire 5 if broken loop detector 833 does not detect a signal on wire 3 generated by fence driver 829.

Microprocessor 818 reads the data stored in input latch 890 using address decoder 824. If a fault condition occurs, microprocessor 818 will enable audio alarm 835 via output latch 819 to sound an alarm and relay 836 to power a 120 Vac outlet 899 for additional warning alarms 898. In addition, microprocessor 818 provides error message data to LCD display 817 stating, for example, "BROKEN WIRE: OUTER LOOP" or "BROKEN WIRE: INNER LOOP". Upon repair of the broken wire 3 or wire 5, the error message, audio alarm 835, and relay 836 may be cleared via switches 832.

After initialization, microprocessor 818 reads the fence address specified by switches 832, saves the fence address, then enters a run mode. In the run mode, microprocessor 818 formats two sets of 8-bit serial data words, the first predetermined word, and the second predetermined word. The first predetermined data word is transmitted from wire 3 and the second predetermined data word is transmitted from wire 5. Microprocessor 818 also generates a gating signal which controls the increase or decrease of power supplied to fence drivers 821 and 829. The strength of the signals transmitted from wires 3 and 5 is (1) increased when the power supplied to fence drivers 821 and 829 is increased and decreased when the power supplied to fence drivers 821 and 829 is decreased.

The first and second data words generated for transmission from wire 3 and wire 5 and the gating signals are latched in output latch 819 using address decoder 824. The first predetermined word is provided to fence driver 829 and the second predetermined data word is provided to fence driver 821 from output latch 819. The partially modulated 38.4 kHz signal is produced using divider 825 and crystal 826. Crystal 826 produces a signal having a fixed frequency. Divider 825 divides the signal to produce a 38.4 kHz signal which is then partially modulated to produce partially modulated signal 2001 shown in FIG. 19. The partially modulated signal 2001 is encoded with the 8-bit serial data word 2000 to produce the signal to be transmitted from wires 3 and 5. The center frequency of the partially modulated signal 2001 is shown as line 2002.

Power supply 820 and power supply 828 are coupled to output latch 819. Power supply 828 is also coupled to fence driver 829 and power supply 820 is coupled to fence driver 821. Each power supply 820 and 828 is controlled using the gating signals stored in output latch 819. The gating signals cause each power supply 820 and 828 to switch between a normal operational power level and a maximum power level. The maximum power level is initiated when a user of the home base 1500 activates the voice communicator or the bark deterrent. Microprocessor 818 adjusts the gating signal in response to the activation of the voice communicator or the bark deterrent. In addition, microprocessor 818 switches the bits in the first and second data words to cause microprocessor 807, shown in FIG. 15, to activate circuitry in transceiver 1604 as discussed above.

A user activates the bark deterrent using switches 832. The activation of the bark deterrent is provided to input latch 890 and subsequently to microprocessor 818 when microprocessor retrieves the data from input latch 890. Based on this data, microprocessor modifies the first and second predetermined words to change bit 6 to a logic one to enable the bark deterrent (See Table 1). When a user enables the bark deterrent, microprocessor 818 also generates a gating signal which is provided to output latch 819. Output latch 819 uses the gating signal to control power supplies 820 and 828 to transmit maximum power from wire 3 and wire 5.

If the animal or person is not in close proximity to either wire 3 or wire 5, the increase in power increases the range from wire 3 and wire 5 at which transceiver 1604 is activated. For example, the energy level transmitted from wires 3 or 5 can be set so that microprocessor 807, shown in FIG. 15, is interrupted when the animal or person is approximately three feet from wire 3 or 5. When the signal is transmitted at maximum power from wire 3 and wire 5, microprocessor 807, shown in FIG. 15, is interrupted when the animal or person is approximately fifteen feet from wire 3 or wire 5. As a result, it is not necessary for the animal or person to be in close proximity to the wire 3 or wire 5 to activate the bark deterrent.

The voice receiver 809, shown in FIG. 15, is also activated by transceiver 1604. The voice transmitter for home base 1500 is described above and is shown in FIG. 4.

Microprocessor 818 can also activate additional fences 881 using relay 880 via input latch 890. Relay 880 is coupled to wire 3 so that, when relay 880 is activated, the additional fences 881 transmit the same signal that is transmitted by wire 3. As a result, the transceiver 1604 is interrupted within or around the predefined containment loop or additional fences 881.

Wire 3 receives the transceiver data word transmitted from transceiver 1604. Diplexer 834 is coupled to wire 3 and effectively separates the partially modulated 38.4 kHz fence signal and the 455 kHz modulated signal containing the transceiver data word into two separate paths. The partially modulated 38.4 kHz fence signal is provide to broken loop detector 833 via diplexer 834 and the 455 kHz signal is provided to 455 kHz data receiver 830. The 455 kHz data receiver may be a Phillips chip part no. NE604. The 455 kHz data receiver is a logarithmic amplifier sensitive to the frequency of 455 kHz. Data generated by 455 kHz data receiver 830 is provided to input latch 890 and then to microprocessor 818 using address decoder 824.

If the transceiver data word includes a bit indicating that the person or animal has escaped, microprocessor 818 programs LCD display 817 to display a message that the person or animal has escaped. For example, the displayed message is "ESCAPE TRANSCEIVER WORN BY THE ANIMAL(S) OR PERSON(S) # x", where x is the identification number of the transceiver 1604 worn by the animal or person which has escaped.

If battery 813 in transceiver 1604, shown in FIG. 14, is not providing an adequate energy level for the transceiver 1604, bit 7 in the transceiver data word is set to a logic one (See Table 2). In response to the received transceiver data word including a logic one at bit seven, microprocessor 818 causes the LCD display 817 to display "LOW BATTERY" on the display. In addition to which animal or persons has escaped and whether the transceiver battery is low, information such as escape time and date, estimated battery life remaining, and the like can be displayed. Upon escape, home base 1500 activates audio alarm 835 and relay 836, which will remain "on" until a reset button is depressed in switches 832.

Figure 18:
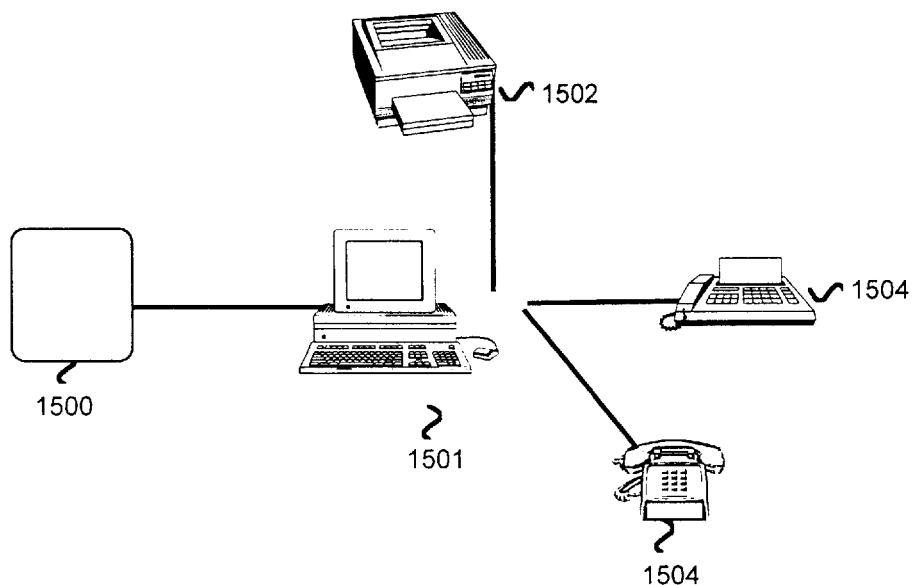
FIG. 18 is another exemplary schematic of a home base integrated with a computer system in accordance with the present invention.
Figure 19:
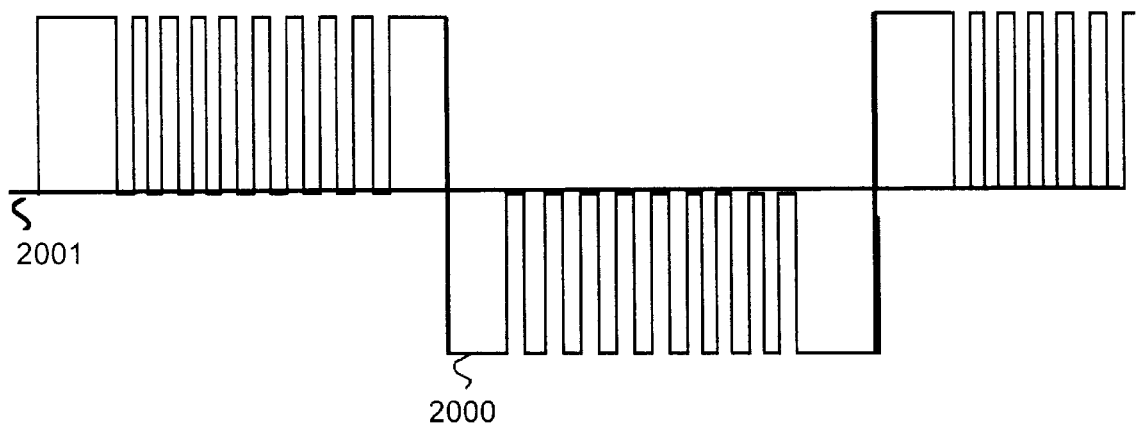
FIG. 19 is a signal diagram illustrating the modulated signals transmitted from the home base shown in FIG. 14.

As shown in FIG. 18, home base 1500 may also be accessed from a remote location. Microprocessor 818 is coupled to personal computer 1501 via data bus 1819 (See FIG. 16). When an animal or person escapes, microprocessor 818 provides a data signal via bus 1819 to computer 1501. In response, computer 1501 saves in a file data relating to the escape. The data includes time of escape and which animal or person has escaped. In addition, any other data which is provided from microprocessor 818 is saved in the file. For example, if telemetry data is transmitted from transceiver 1604 and is received and processed by microprocessor 818, this data is provided to computer 1501. The file is stored on a disk drive, not shown, in computer 1501 and printed on printer 1502.

Computer 1501 can also dial a remote location using a modem or other communicating device connected to telephone 1504. Personal computer 1501 provides a preprogrammed speech synthesized voice message relaying the escaped animal's or person's identification number, time of escape, and any telemetry data transmitted from transceiver 1604. The data stored in the file can also be provided to another computer (not shown) via modem. Alternatively, the computer 1501 can transmit data from facsimile machine 1503 to a predetermined location.

The party receiving the call or information from computer 1501 can request replay of the message or relay commands to home base 1500 via computer 1501. The commands can be provided to computer 1501 using the keypad of a phone or using the other computer via the modem. For example, the bark deterrent can be activated using the keypad of the telephone. In response to the received tones, computer 1501 instructs microprocessor 818 to activate the bark deterrent as described above.

Computer 1501 can also be remotely accessed via phone or another computer to request status information stored in the computer. This data includes telemetry data and battery status for each transceiver. The user can also modify the settings of the system by inputting data as described above.

Figure 21:
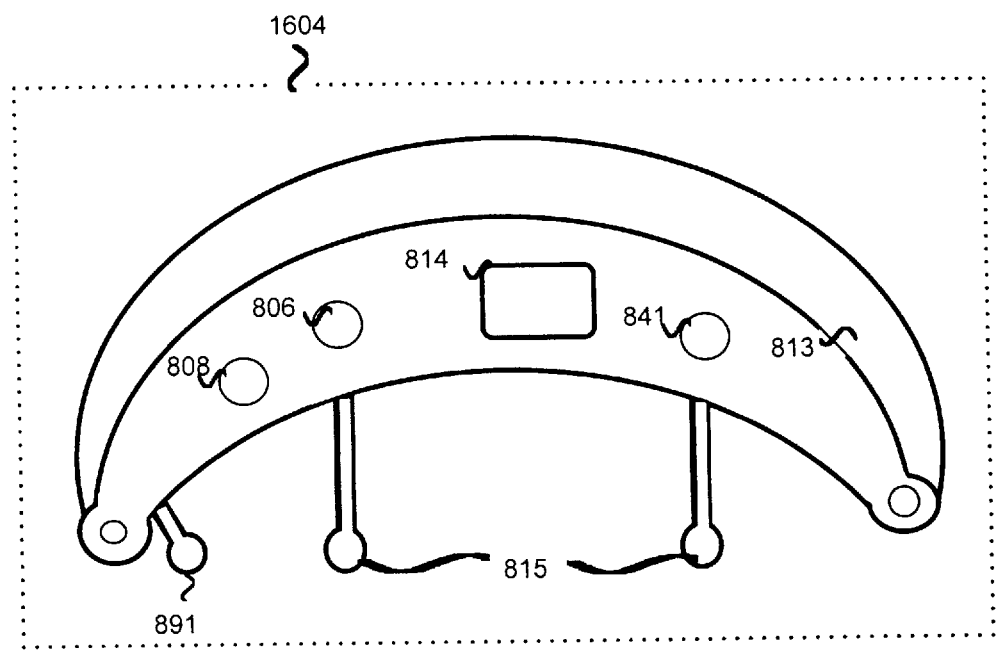
FIG. 21 is a schematic diagram of the transceiver shown in FIG. 14 illustrating the placement of a flexible battery and adjustable components.

FIG. 21 illustrates the structure of transceiver 1604 shown in FIG. 14. Battery 813 is a flexible battery that can be shaped to conform to the housing 1650. The flexible battery is built by Ultralife Battery Inc. and is a lithium thincell battery part no. U3VF-D. The size of the battery can be increased to fill the available space in housing 1650 without increasing the size of the housing using flexible battery 813. When a conventional battery is used, a smaller battery having less energy must be used or the housing must be increased to accommodate the battery.

Figure 22:
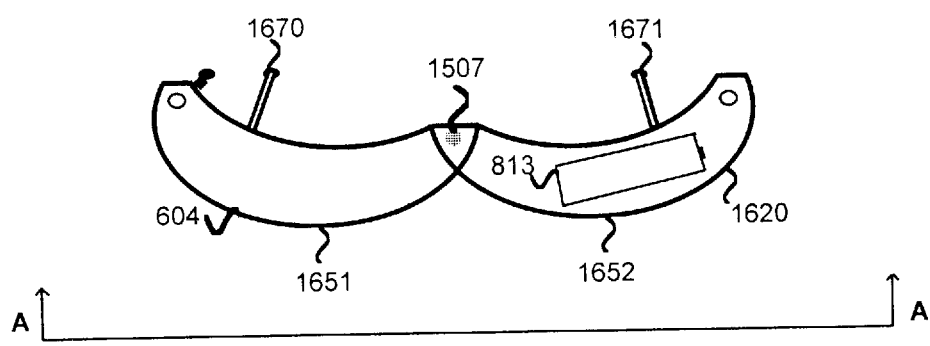
FIG. 22 is a schematic diagram of an exemplary multi-sectional transceiver in accordance with the present invention.
Figure 23:
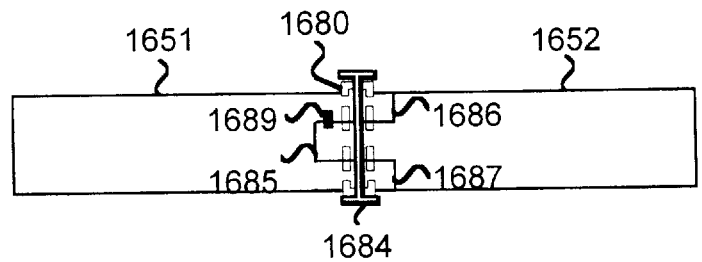
FIG. 23 is a schematic diagram of the multi-sectional transceiver shown in FIG. 22 along line 23—23 illustrating an exemplary coupling of the first and second housings in accordance with the present invention.
Figure 24:
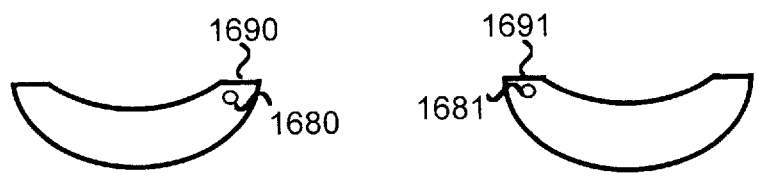
FIG. 24 is a schematic diagram of the multi-sectional transceiver shown in FIG. 22 where the first housing and the second housing are separated.

FIGS. 22–24 illustrate an alternative embodiment of the transceiver 1604 according to the present invention. A first housing 1651 is coupled to a second housing 1652 as shown in FIG. 23. First housing 1651 contains the components of transceiver 1604 shown in FIG. 14 except battery 813. Battery 813 is located in second housing 1652. In addition, shock deterrent probe 1670 is coupled to housing 1651 and shock deterrent probe 1671 is coupled to housing 1652. Shock deterrent probes 1670 and 1671 are each coupled to spike out 815 for administering a shock to the animal or person. Openings 1690 and 1691, shown in FIG. 24, are provided in each housing for receiving wires to interconnect battery 813 and the other components contained in first housing 1651 and shock deterrent probe 1671 to spike out 815. When first housing 1651 and second housing 1652 are coupled, openings 1690 and 1691 form a through hole 1689, shown in FIG. 23, between the first and second housings.

First housing 1651 and second housing 1652 are movably coupled together using pin 1684 which is disposed in opening 1680, shown in FIGS. 23 and 24, in the first housing and in opening 1681, shown in FIG. 24, in the second housing 1652. As shown in FIG. 23, first housing 1651 has extending members 1686 and 1687 which form a U-shape. Second housing 1652 has a complementary extending member 1685 which is received between extending members 1686 and 1687 to rotatably interlock the first housing 1651 and the second housing 1652. The first housing 1651 and the second housing 1652 pivot about pin 1684.

Figure 25:
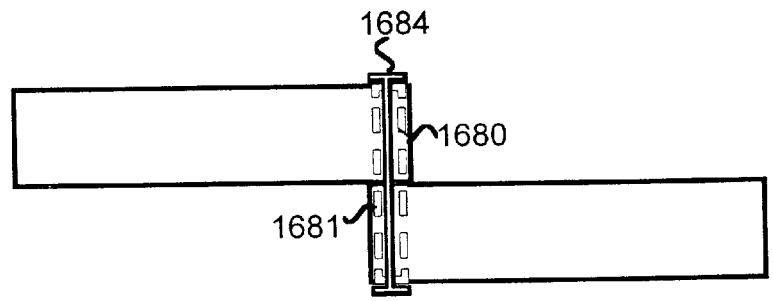
FIG. 25 is a schematic diagram of the multi-sectional transceiver shown in FIG. 22 illustrating another exemplary coupling of the first and second housing in accordance with the present invention.

FIG. 25 is another embodiment for coupling the first housing 1651 to the second housing 1652. The first housing 1651 is placed on top of the second housing so that openings 1680 and 1681 are aligned. The first and second housings 1651 and 1652 are rotatably coupled together using pin 1684. Through hole 1689 receives electrical wires (not shown) for electrically coupling the components in the two housings.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An electronic containment system for one of an animal or person comprising:

home base means for encoding a first signal with first digitally encoded data and for transmitting the encoded first signal; and a transceiver having components and:
   (a) means for receiving the encoded first signal,
   (b) means for determining whether the received encoded first signal was transmitted from the home base means,
   (c) means for activating the components in the transceiver if the determining means determines that the received encoded first signal was transmitted from the home base means; and
   (d) means for producing a deterrent signal which is applied to one of an animal and a person at a specified strength level if the determining means determines that the received encoded first signal was transmitted from the home base means.

2. The system of claim 1 wherein the first digitally encoded data includes data values specifying an adjustment in the specified strength level and wherein the transceiver further has means for adjusting the specified strength level in response to the data values.

3. The system of claim 1 wherein (a) the first digitally encoded data includes data values identifying the home base means and (b) the determining means determines whether the received encoded signal was transmitted from the home base means by examining the data values.

4. The system of claim 1 wherein the transceiver further has means for (a) generating a second signal, (b) encoding a second signal with second digitally encoded data, and (c) transmitting the encoded second signal to the home base means.

5. The system of claim 4 wherein (a) the second digitally encoded data includes data values identifying the transceiver and (b) the home base means further comprises means for receiving the encoded second signal and for determining whether the received encoded second signal was transmitted from the transceiver.

6. The system of claim 5 wherein the transceiver further has a telemetry probe measuring at least one vital sign of one of a person and an animal and producing telemetry data values of the measured vital sign where the second digitally encoded data includes the telemetry data values.

7. The system of claim 6 wherein the measured vital sign includes one of the blood pressure, the body temperature, and the perspiration level.

8. The system of claim 1 wherein the transceiver further has a flexible battery for providing power to the transceiver.

9. An electronic confinement system for one of an animal and a person comprising:

home base means for transmitting a first signal; and a transceiver having:
   (a) means for receiving the first signal,
   (b) means for determining whether the received first signal was transmitted from the home base means,
   (c) a telemetry probe measuring at least one vital sign of one of the person and the animal, and
   (d) means for producing a deterrent signal which is applied to one of the animal and the person at a specified strength level if the determining means determines that the received first signal was transmitted from the home base means.

10. The system of claim 9 wherein the transceiver further has means for encoding a second signal with digitally encoded data and for transmitting the encoded signal to the home base means.

11. The system of claim 10 wherein the transceiver further has means for producing first data values from the measured vital sign and wherein the digitally encoded data includes the data values.

12. The system of claim 10 wherein the digitally encoded data includes transceiver data values identifying the transceiver and the home base means further has means for receiving the encoded second signal and for determining whether the received encoded second signal was transmitted from the transceiver.

13. The system of claim 9 wherein the measured vital sign includes one of the blood pressure, the body temperature, and the perspiration level.

14. The system of claim 9 wherein the transceiver further has a flexible battery for providing power to the transceiver.

15. An electronic containment system for one of an animal and a person comprising:
   home base means for transmitting a signal;
   transceiver having an identification value and including:
      (a) means for receiving the signal, and
      (b) means for transmitting a status signal having status data values;
      (c) means for determining whether the received signal was transmitted from the home base means,
      (d) deterrent means for producing a deterrent signal which is applied to one of an animal and a person at a specified strength level if the determining means determines the received signal was transmitted from the home base means, and
      (e) means for producing a deterrent data value if the deterrent signal is applied to one of the person and the animal,
      wherein the status data values include the identification value and the deterrent data value;
      said home base means further comprising means for receiving the status signal; and
      computer means, coupled to the home base means, for storing the status signal.

16. The system of claim 15 wherein the transceiver has an identification value and further has a battery with a strength level value, wherein the status data values include the identification value and the strength level value.

17. The system of claim 15 wherein the transceiver has an identification value and further has a telemetry probe (a) measuring at least one vital sign of one of a person and an animal and (b) producing a vital sign data value, wherein the status data values include the identification value and the vital sign data value.

18. The system of claim 15 wherein the computer means stores a strength data value specifying the specified strength level.

19. The system of claim 18 wherein the computer means records the date and time whenever the deterrent data value is received in the status data values by the computer means.

20. The system of claim 15 wherein the computer means plays a status message in response to the status data values.

21. The system of claim 15 wherein the computer means transmits a status message using one of a facsimile apparatus and a modem to a remote location in response to the status data values.

22. The system of claim 15 wherein the transceiver further has a flexible battery providing power to the transceiver.

23. An electronic containment system for one of an animal and a person comprising:
   home base means for transmitting a signal; and
   a transceiver having:
      (a) means for receiving the signal,
      (b) means for determining whether the received signal was transmitted from the home base means,
      (c) a second housing having an extending member, and
      (d) a first housing coupled to the second housing and having a U-shaped member for receiving the extending member.

24. The system of claim 23 wherein the extending member and the U-shaped member each have an opening extending therethrough, the transceiver further having a pin disposed in the opening.

25. The system of claim 23 wherein the transceiver further has a battery and the first housing contains the determining means and the second housing contains the battery.

26. An electronic containment system for one of an animal and a person comprising:
   home base means for transmitting a signal; and
   a transceiver having:
      (a) means for receiving the signal,
      (b) a microprocessor with a wake mode and a sleep mode,
      (c) interrupt means for switching the microprocessor from the sleep mode to the wake mode in response to the received signal,
      (d) means for determining whether the received signal was transmitted from the home base means, and
      (e) deterrent means for producing a deterrent signal which is applied to one of the animal and the person at a specified strength level if the deterrent means determines the received signal was transmitted from the home base means.

27. An electronic containment system for one of an animal and a person comprising:
   home base means for transmitting a signal that defines a predetermined confinement area;
   a transceiver having an identification value and:
      (a) means for receiving the signal,
      (b) means for transmitting a status signal having status data values;
      (c) means for determining whether one of a person and an animal has escaped the predetermined confinement area in response to the received signal, and
      (d) means for generating an escape data value if one of the person and the animal has escaped the predetermined confinement area;
      wherein the status data values include the identification value and the escape data value; and
   said home base means further comprising means for receiving the status signal;
   computer means, coupled to the home base means, for storing the status signal; and
   said computer means stores a strength data value specifying a specified strength level.

28. An electronic containment system for one of an animal and a person comprising:
   home base means for transmitting a signal; and
   a transceiver having:
      (a) means for receiving the signal,
      (b) means for determining whether the received signal was transmitted from the home base means,
      (c) a first housing having a first coupling end; and
      (d) a second housing coupled to the first housing and having a second coupling end which overlaps the first coupling end;
      the first coupling end and the second coupling end each having an opening therethrough, wherein the transceiver further has a pin disposed in the opening.

* * * * *

UNITED STATES PATENT AND TRADE MARK OFFICE
CERTIFICATE OF CORRECTION

PATENT NO. : 5,808,551
DATED : September 15, 1998
INVENTOR(S) : Yarnall, Jr. et al.

It is certified that error appears in the above-identified patent and that said Letters Patent is hereby corrected as shown below:

On the title page:

Item [56] References Cited, U.S. Patent Documents, "4,371,937" should be --4,371,934--.

In Column 4, line 32, start a new paragraph after "invention;" and before "FIG.15".

In Column 15, line 55, delete "mod" and insert --mode--.

In Column 16, line 52, delete "with" and insert --within--.

In Column 17, line 37, delete "determining" and insert --determines--.

In Column 20, line 13, delete "provide" and insert --provided--.

Signed and Sealed this

Thirtieth Day of March, 1999

Attest:

Q. TODD DICKINSON

*Attesting Officer*  Acting Commissioner of Patents and Trademarks